United States Patent
Godefroid et al.

(10) Patent No.: US 11,321,219 B2
(45) Date of Patent: May 3, 2022

(54) INTELLIGENTLY FUZZING DATA TO EXERCISE A SERVICE

(71) Applicant: MICROSOFT TECHNOLOGY LICENSING, LLC, Redmond, WA (US)

(72) Inventors: Patrice Godefroid, Mercer Island, WA (US); Bo-Yuan Huang, West Windsor, NJ (US); Marina Polishchuk, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 74 days.

(21) Appl. No.: 16/741,445

(22) Filed: Jan. 13, 2020

(65) Prior Publication Data
US 2021/0216435 A1    Jul. 15, 2021

(51) Int. Cl.
*G06F 11/36*    (2006.01)

(52) U.S. Cl.
CPC ........ *G06F 11/3636* (2013.01); *G06F 11/362* (2013.01)

(58) Field of Classification Search
CPC ........................... G06F 11/3636; G06F 11/362
See application file for complete search history.

(56) References Cited

U.S. PATENT DOCUMENTS

| 6,467,052 B1 * | 10/2002 | Kaier | G06F 11/302 |
| | | | 714/39 |
| 10,164,848 B1 * | 12/2018 | Chen | G06F 11/3684 |
| 10,452,522 B1 * | 10/2019 | Arguelles | G06F 11/3414 |

(Continued)

FOREIGN PATENT DOCUMENTS

CN    108171064 A    6/2018

OTHER PUBLICATIONS

Andrea Arcuri, "RESTful API Automated Test Case Generation," 2017 [retrieved on Dec. 15, 2021], 2017 IEEE International Conference on Software Quality, Reliability and Security (QRS), pp. 9-20, downloaded from <url>:https://ieeexplore.ieee.org. (Year: 2017).*

(Continued)

*Primary Examiner* — S. Sough
*Assistant Examiner* — Stephen D Berman
(74) *Attorney, Agent, or Firm* — Workman Nydegger

(57) ABSTRACT

Improved techniques for testing an application to identify bugs. An API request body, which includes input data, is transmitted to a service to exercise the service. An error type response is received from the service, where the response indicates how the service handled the input data. The response is then used to determine an error type response coverage of the service. The coverage is then expanded by repeatedly performing a number of operations until a threshold metric is satisfied. For instance, in response to learning how previously-used input data impacted the coverage, new input data is generated. This new input data is designed to trigger new types of responses from the service. The new input is sent to the service, and a new error type response is received. These processes are repeated in an effort to expand the error type response coverage of the remote service.

20 Claims, 20 Drawing Sheets

(56) References Cited

U.S. PATENT DOCUMENTS

| | | | | |
|---|---|---|---|---|
| 2008/0301647 | A1* | 12/2008 | Neystadt | G06F 11/3672 717/127 |
| 2014/0380105 | A1* | 12/2014 | Michel | G06F 11/0709 714/57 |
| 2018/0121321 | A1* | 5/2018 | Standley | G06F 9/4411 |
| 2018/0365139 | A1 | 12/2018 | Rajpal et al. | |
| 2021/0011837 | A1* | 1/2021 | Coppa | G06N 20/00 |

OTHER PUBLICATIONS

"International Search Report and Written Opinion Issued in PCT Application No. PCT/US20/064961", dated Mar. 23, 2021, 12 Pages. (MS# 407956-WO-PCT).
"Amazon Web Services—Cloud Computing Services", Retrieved from: https://aws.amazon.com/, Retrieved Date: Jan. 22, 2020, 16 Pages.
"American Fuzzy Lop", Retrieved from: http://lcamtuf.coredump.cx/afl/, Retrieved Date: Jan. 22, 2020, 6 Pages.
"APIFortress", Retrieved from: https://apifortress.com/, Retrieved Date: Jan. 22, 2020, 9 Pages.
"APIFuzzer", Retrieved from: https://github.com/KissPeter/APIFuzzer, Retrieved Date: Jan. 22, 2020, 2 Pages.
"Apigee Docs", Retrieved from: https://docs.apigee.com/, Retrieved Date: Jan. 21, 2020, 6 Pages.
"AppSpider", Retrieved from: https://www.rapid7.com/products/appspider, Retrieved Date: Jan. 22, 2020, 10 Pages.
"Azure REST API Specifications", Retrieved from: https://github.com/Azure/azure-rest-api-specs, Retrieved Date Jan. 22, 2020, 3 Pages.
"Burp Suite Editions", Retrieved from: https://portswigger.net/burp, Retrieved Date: Jan. 24, 2020, 5 Pages.
"HttpMaster", Retrieved from: https://www.httpmaster.net/, Retrieved Date: Jan. 22, 2020, 4 Pages.
"Mass Assignment Cheat Sheet", Retrieved from: https://github.com/OWASP/CheatSheetSeries/blob/master/cheatsheets/Mass_Assignment_Cheat_Sheet.md, Retrieved Date: Jan. 22, 2020, 8 Pages.
"Microsoft Azure Cloud Computing Platform & Services", Retrieved from: https://azure.microsoft.com/en-US/, Retrieved Date: Jan. 22, 2020, 16 Pages.
"Microsoft Azure DNS Service Documentation", Retrieved from: https://docs.microsoft.com/en-us/azure/dns/, Retrieved Date: Jan. 22, 2020, 1 Page.
"OWASP API Security Project", Retrieved from: https://owasp.org/www-project-api-security/, Retrieved Date: Jan. 22, 2020, 3 Pages.
"Peach Fuzzer", Retrieved from: http://www.peachfuzzer.com/, Retrieved Date: Mar. 2, 2018, 4 Pages.
"Postman : The Collaboration Platform for API Development", Retrieved from: https://www.getpostman.com/, Retrieved Date: Jan. 22, 2020, 5 Pages.
"Qualys Web Application Scanning", Retrieved from: https://www.qualys.com/apps/web-app-scanning/, Retrieved Date Jan. 24, 2020, 11 Pages.
"REST-assured", Retrieved from: http://rest-assured.io/, Retrieved Date: Jan. 22, 2020, 4 Pages.
"SoapUI", Retrieved from: https://www.soapui.org/, Retrieved Date: Jan. 22, 2020, 6 Pages.
"SPIKE Fuzzer", Retrieved from: https://resources.infosecinstitute.com/fuzzer-automation-with-spike/, Dec. 14, 2010, 25 Pages.
"Swagger", Retrieved from: https://swagger.io/, Retrieved Date: Jan. 24, 2020, 4 Pages.
"vREST—Automated REST API Testing Tool", Retrieved from: https://vrest.io/, Retrieved Date: Jan. 22, 2020, 4 Pages.
Allamaraju, Subbu, "RESTful Web Services Cookbook", In Publication of O'Reilly Media. Inc, Mar. 2010, 314 Pages.
Atlidakis, et al., "RESTLER: Stateful REST API Fuzzing", In Proceedings of the 41st International Conference on Software Engineering, May 31, 2019, 11 Pages.
"TnT-Fuzzer", Retrieved from: https://github.com/Teebytes/TnT-Fuzzer, Retrieved Date:Jan. 24, 2020, 3 Pages.
Forrester, et al., "An Empirical Study of the Robustness of Windows NT Applications Using Random Testing", In Proceedings of the 4th USENIX Windows System Symposium, Aug. 3, 2000, 10 Pages.
Fielding, Roy Thomas, "Architectural Styles and the Design of Networkbased Software Architectures", In Architectural Styles and the Design of Network-Based Software Architectures vol. 7, Jun. 2000, 180 Pages.
Godefroid, et al., "Automated Whitebox Fuzz Testing", In Proceedings of Network and Distributed System Security Symposium, 2008, 16 Pages.
Liu, et al., "What Bugs Cause Production Cloud Incidents", In Proceedings of the Workshop on Hot Topics in Operating Systems, May 13, 2019, pp. 155-162.
Newman, Sam, "Building Microservices", In Publication of O'Reilly Media, Inc, Feb. 2015, 102 Pages.
Pereyda, Joshua, "Boofuzz Network Protocol Fuzzing for Humans", Retrieved from: https://github.com/jtpereyda/boofuzz, Retrieved Date: Jan. 24, 2020, 4 Pages.
"OpenRCE Sulley", Retrieved from: https://github.com/OpenRCE/sulley, Retrieved Date:Jan. 24, 2020, 3 Pages.

* cited by examiner

INTELLIGENTLY FUZZING DATA TO EXERCISE A SERVICE

BACKGROUND

The phrase "code coverage" generally refers to a measuring value or metric used to help developers understand what percentage of a body of source code has been tested to identify programming deficiencies or "bugs." By providing this metric, developers are able to obtain a better understanding regarding the durability and robustness of their applications (e.g., how those applications respond to different circumstances and data).

There are many tools currently available in the industry to determine an application's code coverage. These tools typically require access to the application's source code. Once the tools analyze the source code, the tool is able to generate different kinds and amounts of testing data. The testing data is fed into the application, and the application is monitored to determine how it reacts to the test data. By monitoring the application's reactions to the testing data, the tool is able to gauge the application's durability with regard to handling different types of data.

The phrase "data fuzzing" or simply "fuzzing" refers to a debugging technique in which invalid data is purposely generated and fed as input into an application in order exercise the application. In this regard, "fuzzing" means automatic test generation and execution with the goal of finding security vulnerabilities. Code coverage tools often rely on data fuzzing techniques to better determine code coverage. For instance, code coverage tools are able to monitor applications while those applications are attempting to handle the fuzzed data. Crashes, memory leaks or dumps, exceptions, race conditions, and other programming deficiencies can be exposed within the applications through the use of the code coverage tools and fuzzed data.

The above-described code coverage tools and fuzzing techniques work well when the tools have access to an application's underlying source code. That is, by having access to the source code, the tools are able to readily gain a comprehensive understanding of the operability of an application. The testing data (e.g., including fuzzed data) is then specifically designed to exercise the application in numerous ways. Significant problems arise, however, when the application's underlying source code is no longer available because the tools are no longer able to analyze the source code to determine how to exercise the application.

Indeed, such problems are becoming more and more pronounced with the increased usage of cloud services because it is often the case that a cloud service operates essentially as a so-called "black box" to many users and client-side developers. For instance, it is becoming more common for a cloud service's source code to be inaccessible to client-side entities. Because of this reduced or even complete inaccessibility to source code, traditional code coverage tools and fuzzing techniques are becoming either obsolete or substantially impaired in their abilities to test and exercise an application. Accordingly, there is a substantial need in the field to provide improved techniques for exercising applications/services, especially remote services. There is also a substantial need to improve how those exercising processes are performed in view of the potentially remote nature of a service.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, methods, and devices that expand an error type response coverage of a remote service by intelligently generating input data, which is to be fed into the service to exercise the service, and by dynamically modifying subsequent input data based on how the remote service handled the previous input data. By determining and progressively expanding the error type response coverage, the embodiments are able to beneficially determine the robustness and durability of the service/application.

In some embodiments, an application programming interface (API) request body is generated for a remote service's API. This API request body includes input data. The API request body is transmitted to the remote service to "exercise" (i.e. test) the remote service. This testing is performed in an effort to identify a programming deficiency of the remote service using the input data. An error type response is then received from the remote service. This error type response indicates how the remote service handled the input data. The error type response is then used to determine an error type response coverage of the remote service. Subsequently, there is an attempt to expand the error type response coverage by repeatedly performing a number of operations.

These operations may be repeated until such time as a particular threshold metric associated with the error type response coverage is satisfied. For instance, in response to learning how previously-used input data impacted the error type response coverage, new input data is selectively generated. This new input data is generated or designed to elicit, from the remote service, a new error type response that is nonoverlapping with previous error type responses. A new API request body, which now includes the newly generated input data, is then transmitted to the remote service to exercise the remote service using this new data. Subsequently, a new error type response is received from the remote service. This new error type response indicates how the remote service handled this new data. As described above, these processes may be repeated in an effort to expand the error type response coverage of the remote service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
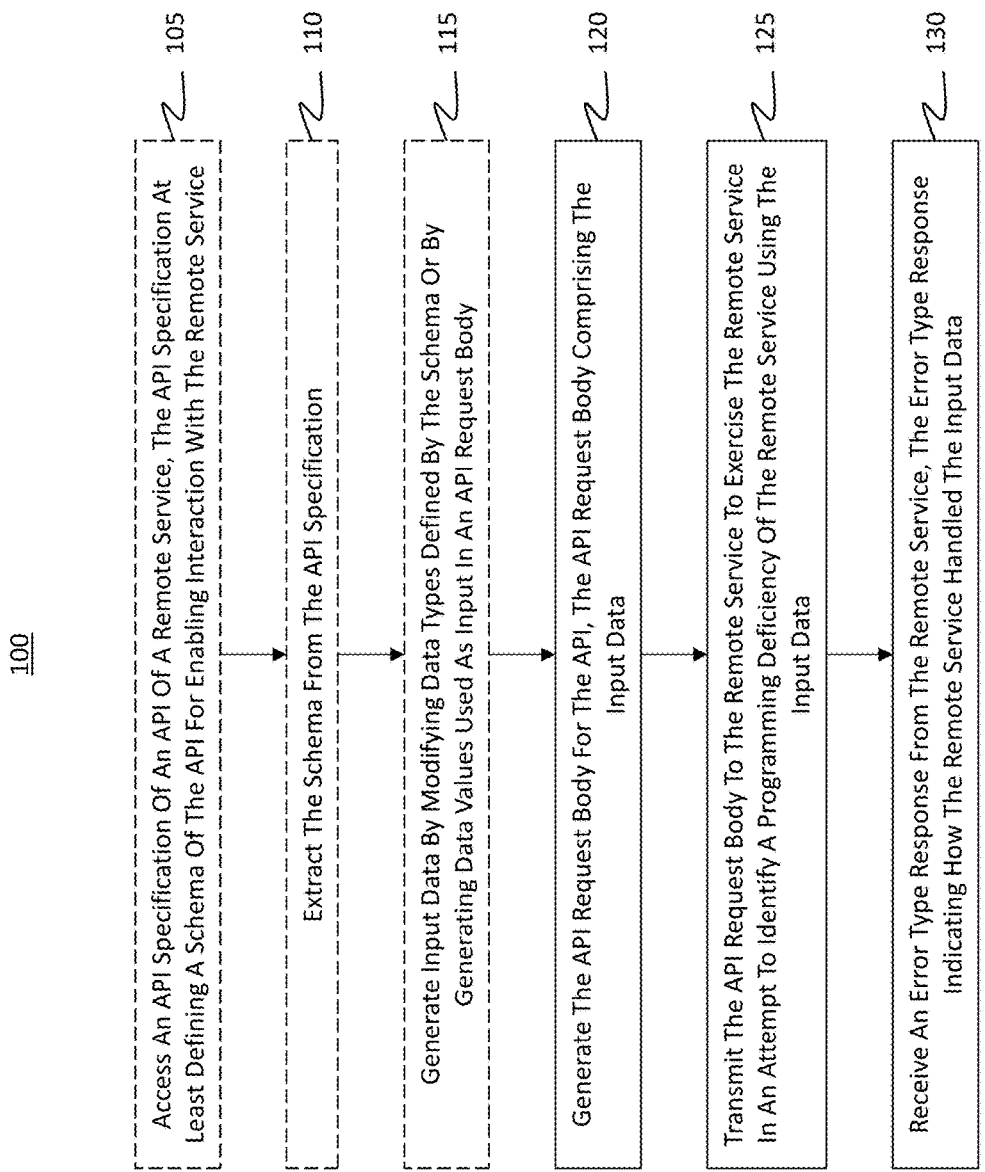
FIGS. 1A, 1B, and 1C illustrate a flowchart of an example method for intelligently generating test data, which is to be fed into a service in order to exercise the service and in order to determine how the service handles the test data.

Embodiments disclosed herein relate to systems, methods, and devices that expand an error type response coverage of a remote service by intelligently generating input data, which is to be fed into the service to exercise the service, and by dynamically modifying subsequent input data based on how the remote service handled the previous input data. As used herein, "error type response coverage" generally refers to an extent or degree by which a service is able to handle different types of invalid data by throwing specific errors in response to that invalid data and by determining the coverage without providing access to the service's underlying source code. By determining and progressively expanding the error type response coverage, the embodiments are able to beneficially determine the robustness and durability of the service/application.

In some embodiments, an API request body is generated for a remote service. This API request body, which includes input data, is transmitted to the remote service to exercise the remote service. This testing is performed to identify deficiencies of the remote service. An error type response is received from the remote service, where the response indicates how the remote service handled the input data. The response is used to determine an error type response coverage of the remote service. An attempt to expand the coverage is then performed by repeatedly performing a number of operations until a particular threshold metric is satisfied. For instance, in response to learning how previously-used input data impacted the coverage, new input data is selectively generated. This new input data is designed to trigger a new error type response from the service. The new input is sent to the service via a new API request body. Subsequently, a new error type response is received, where the new error type response indicates how the remote service handled this new data. As described above, these processes may be repeated in an effort to expand the error type response coverage of the remote service.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about substantial benefits to the current technical field. For instance, the embodiments provide lightweight and low-cost techniques for determining the capabilities of a remote service to handle invalid data. That is, it is often the case that clients provide obscure or invalid data to a service. It is highly beneficial and desirous to program or configure the service to be able to handle such invalid data. If the service were not able to handle this invalid data, then the user's interaction with the service will be impaired, and the user may refrain from continuing to use the service. Significant loss in business may occur as a result. As such, it is beneficial to provide a highly robust and durable service to clients. To provide a robust service, it is beneficial to ensure that the service has been exercised a sufficient amount. Accordingly, the disclosed embodiments intelligently generate data payloads embedded in API requests in order to find data-processing bugs in remote services (e.g., cloud services).

By "intelligently," it is generally meant that the disclosed fuzzing techniques are able to find programming deficiencies even with a limited testing budget. For instance, simple black box random fuzzing techniques may work well for binary formats, but such techniques are generally inadequate or ineffective for testing structured data (e.g., JSON data) because the probability of generating new inputs is quite low. Relatedly, so-called "symbolic-execution-based whitebox fuzzing" or simpler "code-coverage-guided greybox fuzzing" are not applicable because the service under test may now be a remote distributed black box type of service.

With the migration to remote cloud-based services, many developers no longer have access to a service's underlying source code. As such, traditional techniques for exercising a service to determine code coverage are inadequate. The disclosed embodiments satisfy this new need by providing systems for remotely exercising an application to determine its robustness and to determine its operational coverage. By providing this need, the embodiments help safeguard against and/or identify programming deficiencies in the service. These deficiencies may then be resolved. As a consequence, a user's interactions with the service will be improved.

Additionally, the embodiments improve the operational efficiency of a computer and a service. That is, the embodiments intelligently and efficiently identify programming deficiencies. Because programming deficiencies often adversely impact functionality, the embodiments improve a computer and system's functionality and efficiency by identifying and potentially resolving these deficiencies. Additionally, the disclosed embodiments intelligently leverage API specifications, which include data schemas for API request bodies, in order to automatically (e.g., without requiring developer intervention) generate fuzzed data. Accordingly, the embodiments bring about numerous and substantial improvements to the technical field. Additional improvements are described throughout the remaining portions of this disclosure.

Figure 1B:
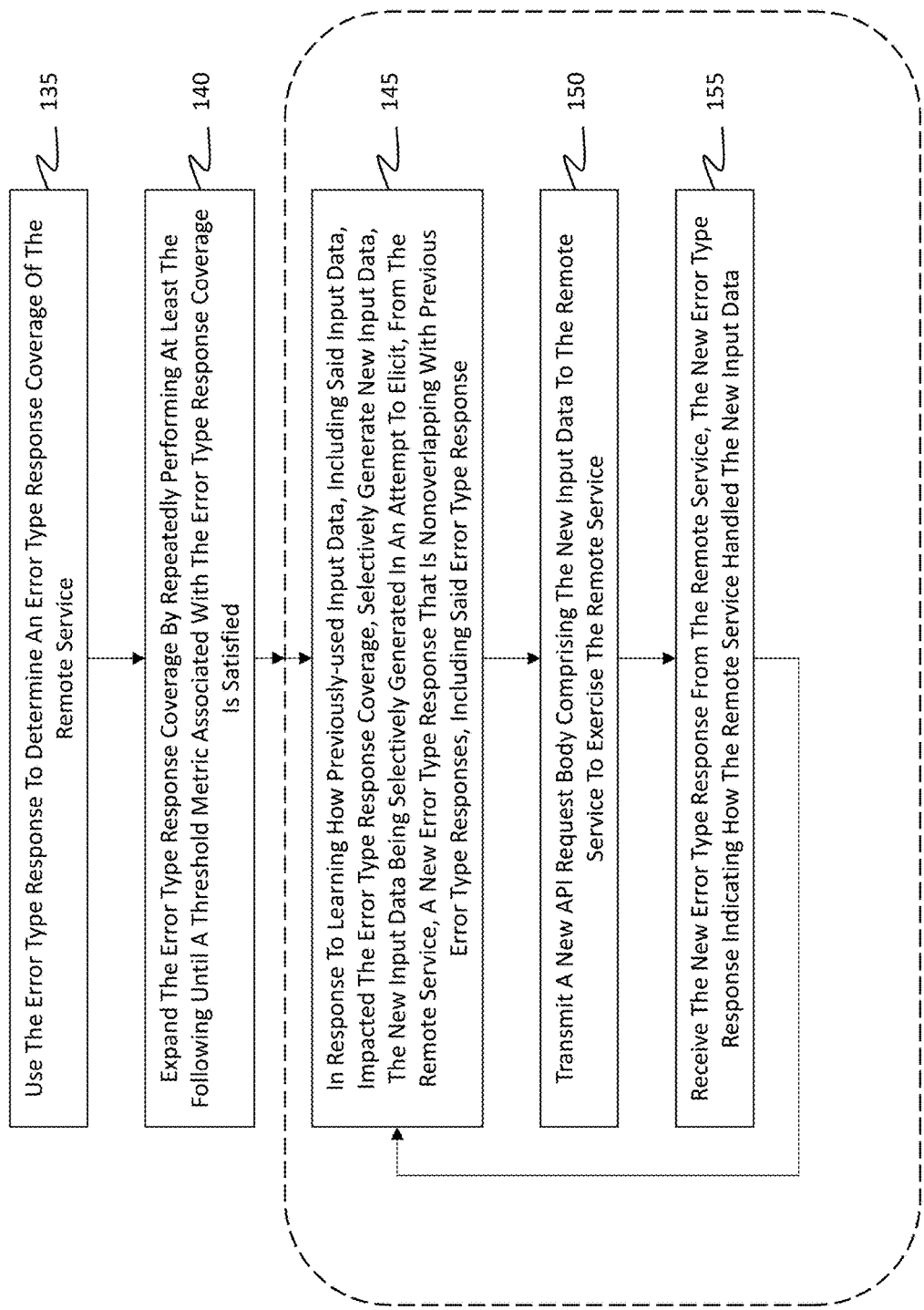
Figure 1C:
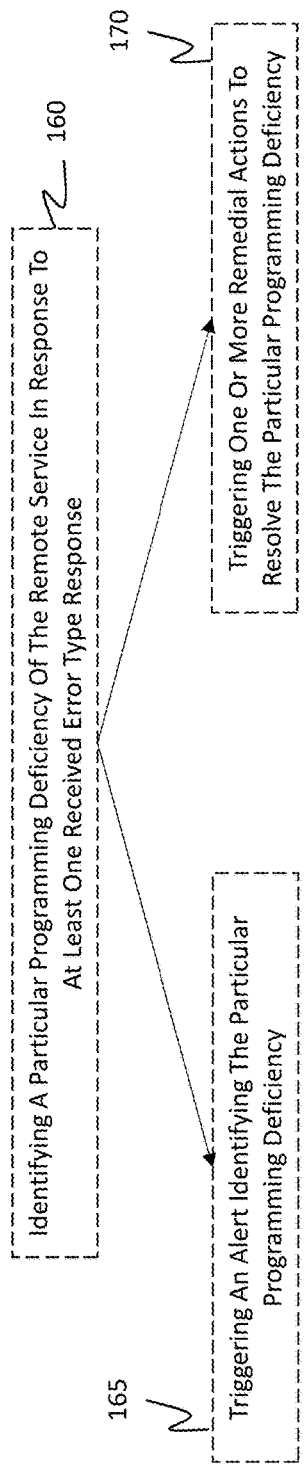

FIGS. 1A, 1B, and 1C refer to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Attention will now be directed to FIGS. 1A, 1B, and 1C. These figures illustrate a flowchart of an example method 100 for dynamically expanding an error type response coverage of a remote service by intelligently fuzzing or modifying input data designed to exercise the remote service in various ways. It should be noted that these figures illustrate a few acts or steps illustrated using a "dashed" outline. This dashing is provided to reinforce the concept that such processes are optional processes and may not necessarily be performed.

Figure 2:
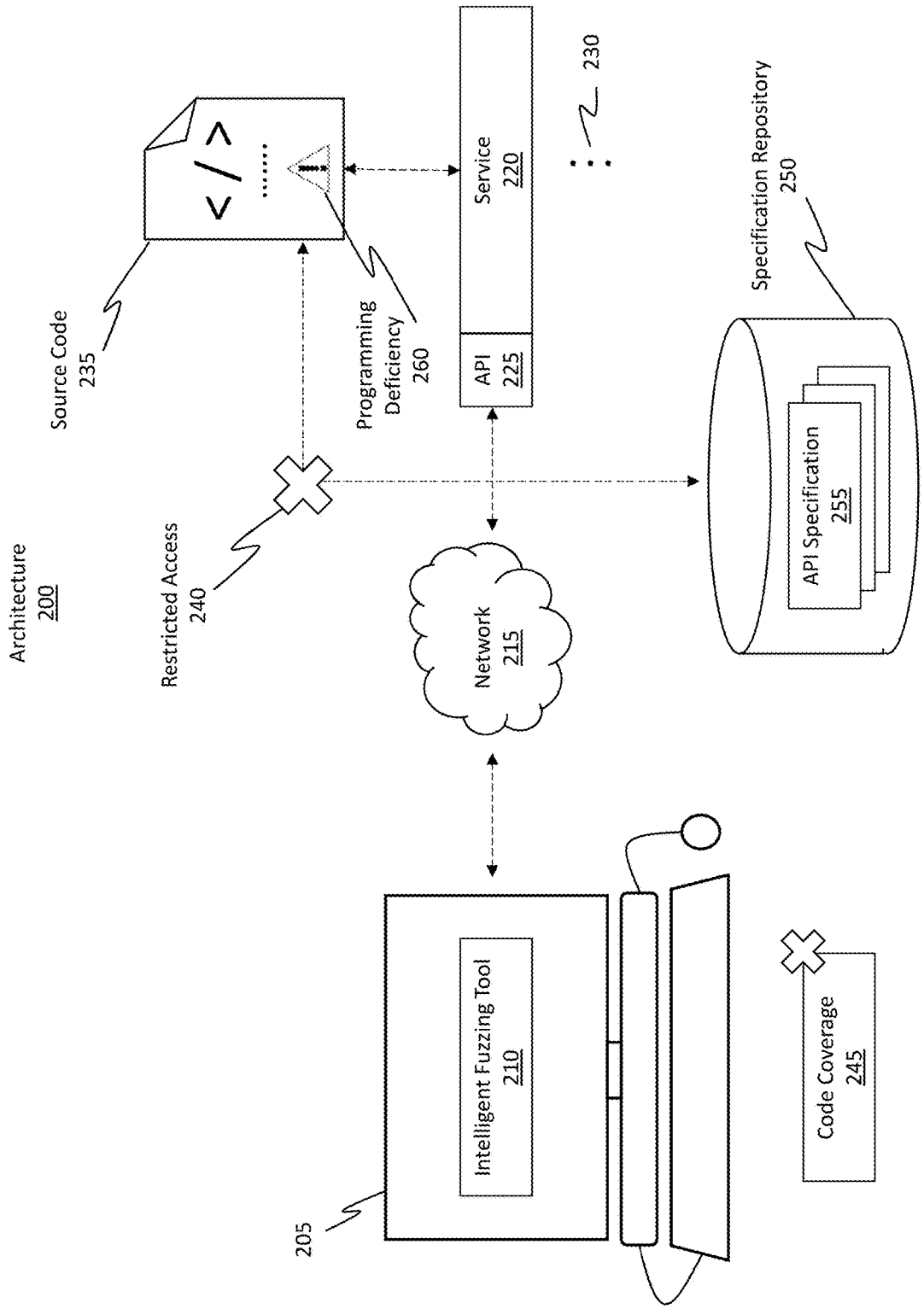
FIG. 2 illustrates an example architecture in which an intelligent fuzzing tool initially identifies a schema for an application programming interface (API) of a remote service.

Method 100 includes an initial optional act (act 105) of accessing an API specification of an API of a remote service. Notably, this API specification at least defines a schema of the API to enable interaction with the remote service. FIG. 2 provides a useful illustration of such a process.

For instance, FIG. 2 shows an example architecture 200 comprising a client-side computer system 205, which is configured to execute an intelligent fuzzing tool 210. The intelligent fuzzing tool 210 is executable on the computer system 205 and may be configured to perform the method acts described in connection with method 100 of FIGS. 1A, 1B, and 1C.

In accordance with the disclosed embodiments, the intelligent fuzzing tool 210 is able to communicate over a network 215 with any number of remote services, such as service 220. Service 220 may be any type of service made available to users (e.g., via a network connection, such as the Internet) on an on-demand basis. Such services are capable of providing scalable access to resources, processes, compute power, applications, and so forth. Examples of services include, but are not limited to, data backup and storage, computation resources, email services, data processing, and so forth, without limit.

Service 220 is shown as including or being associated with API 225. As used herein, an API is a collection or set of functions, features, and/or procedures that are provided to allow requestors access to the functionality of an application or service. For instance, API 225 is provided to enable an external entity (e.g., an external application, developer, or even the intelligent fuzzing tool 210) access to the features provided by service 220. Further details on APIs will be provided later. It should be noted, however, that although FIG. 2 shows only a single service 220 and API 225, the ellipsis 230 is provided to demonstrate how any number of services and APIs may be available over the network 215 to the intelligent fuzzing tool 210. For instance, the number of services and APIs may be in the hundreds, thousands, or even millions.

FIG. 2 also shows how the service 220 is located remotely relative to the computer system 205. By way of example, service 220 may be a cloud-based service provided in a cloud computing environment. Although service 220 is shown as being remote, the principles described herein may also be practiced in scenarios where the service 220 is local to the computer system 205, as will be described in more detail later. As will be described in more detail later, regardless of where the service is located relative to the intelligent fuzzing tool 210, it is often the case that the service's source code is inaccessible to the intelligent fuzzing tool 210. As such, traditional code coverage techniques of analyzing the source code are generally not available.

A service is defined by source code, which in-turn defines the functions the service is able to perform. For instance, source code 235 defines the set of features and functions that service 220 provides. Notice, in the scenario presented in FIG. 2, there is restricted access 240 to the source code 235. That is, in this particular scenario, the intelligent fuzzing tool 210 to prevented from accessing the underlying source code 235 of the service 220. Because of this restricted access 240, traditional techniques of testing and monitoring code coverage (as discussed earlier) are quite limited and often entirely deficient. Code coverage 245 symbolically shows the limitation of traditional techniques via the use of the large "x" over the code coverage 245 box in FIG. 2. Accordingly, access to the source code 235 of the remote service 220 is restricted such that the computer system 205 (and the intelligent fuzzing tool 210) is prevented from being able to instrument or analyze the source code 235 to measure code coverage.

FIG. 2 also shows a specification repository 250, which is a type of computing data storage unit (e.g., memory) and which is shown as storing any number of API specifications, including API specification 255. In this example, API specification 255 is associated with the API 225 and specifically documents, comments, describes, or otherwise defines the functionalities and features API 225 uses. That is, API specification 255 provides a description regarding how API 225 behaves and how API 225 communicates or links with other APIs.

Additionally, API specification 255 describes the types of data values and inputs API 225 is able to receive as input and the types of data values and outputs the API 225 is able to provide as output. By way of example, a particular API specification may describe how a client request can create (e.g., PUT/POST), monitor (e.g., GET), update (e.g., PUT/POST/PATCH), and delete (e.g., DELETE) cloud resources. Additionally, an API specification may clarify how the body of a particular request (aka an API request body) or query is to include certain cloud resource identifiers. In some cases, the API specification may dictate that the identifiers are to be specified in the path of the request or perhaps the body of the request. The API specification may also identify additional input parameters values (e.g., in the path or body). Such parameter values and their formats are described in a so-called "schema" that is also a part of the API specification. A combination of concrete input parameter values included in a request body (or API request body) is called a body "payload" or "input data." Additional details on a schema will be provided later.

Figure 3B:
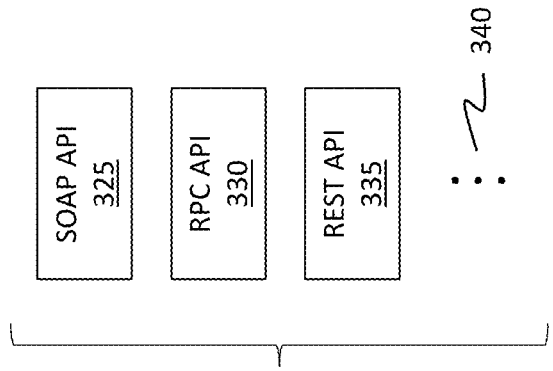
FIGS. 3A and 3B illustrate different attributes related to services and APIs.
Figure 3A:
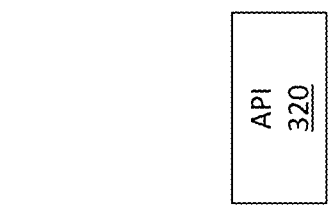
Figure 3A:
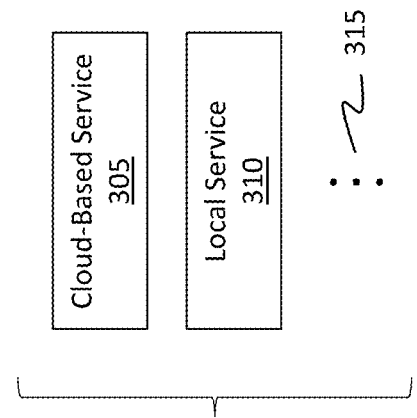
Figure 3A:

Turning briefly to FIGS. 3A and 3B, FIG. 3A shows an example service 300, which is representative of the service 220 from FIG. 2. As described above, service 300 may be configured in an unlimited number of ways, some of which include a cloud-based service 305 or even a local service 310. The ellipsis 315 is provided to illustrate how any type of service may be included as service 300.

Similarly, FIG. 3B shows an API 320, which is representative of API 225 from FIG. 2. API 320 can be any type of API, including but not limited to, a simple object access protocol (SOAP) API 325, a remote procedure call (RPC) API 330, and a representational state transfer (REST) API 335. The ellipsis 340 illustrates how any other API type may be used as well.

Generally, SOAP API 325 is a standard type of communication protocol that allows different operating systems to communicate using HTTP and XML. Often, SOAP APIs are provided to perform specific operations with regard to accounts, such as update, create, delete, or recover those accounts.

RPC API 330 is a relatively simple type of API. Generally, RPC APIs deal with executing code on another computing device, such as a server. In some cases (e.g., when HTTP is used), an RPC API can be used as a web API.

A REST API or an API that is RESTful relates to an architectural software style defining different conditions, limitations, and constraints to create web-based services. REST APIs are implemented on top of the HTTP/S protocol and offer a uniform way to manage cloud resources. Using APIs that conform to REST conditions/requirements enables computer systems to interoperate over the Internet. Cloud service developers can document REST APIs using different interface-description languages, such as Swagger or OpenAPI, in the API specification 255 of FIG. 2. In this regard, the API specification describes how to access a cloud service through its REST API, including what requests the service can handle, what responses may be received, and the request and response formats.

Generally, REST requires the following six different architectural constraints: (1) uniform interface, (2) client-server, (3) stateless, (4) cacheable, (5) layered system, and (6) code on demand. These different constraints, along with the REST architecture, are generally known in the art and will not be discussed in detail herein. In any event, the service 220 and the API 225 in FIG. 2 may be any type of service and any type of API, without limit. In some embodiments, API 225 is specifically a REST API and the service 220 is a remote service based in the cloud (i.e. a cloud-based service). Accordingly, the disclosed embodiments are able to access an API specification of a service's API.

Figure 4:
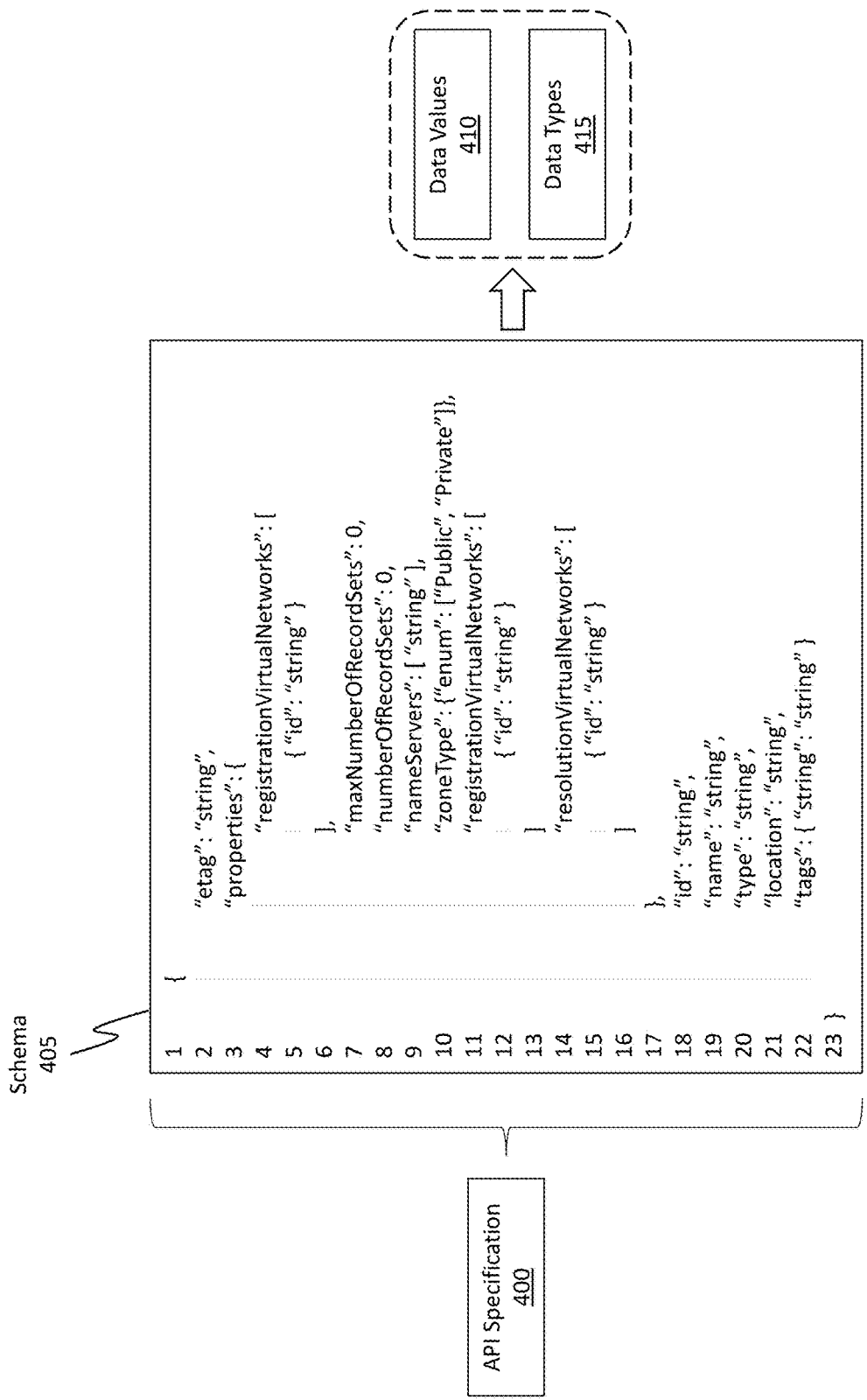
FIG. 4 illustrates an example of a particular schema and how the schema defines data types and potentially even data values that are supported by a corresponding API.

Returning to FIG. 1A, method 100 includes another optional act (act 110) of extracting a schema from the API specification described in act 105. This schema defines which specific data types and perhaps data values or data ranges are supported by the API. In this regard, the schema provides at least some of the API documentation that was discussed earlier. FIG. 4 is illustrative of an example schema representative of the schema described in act 110.

In particular, FIG. 4 shows an API specification 400, which is representative of the API specification 255 in FIG. 2 and the API specification mentioned in act 105. API specification 400 includes a schema 405 outlining or defining the properties, features, and functions of a corresponding API. For instance, schema 405 defines data values 410 (or ranges) and data types 415 provided or supported by the corresponding API. Schema 405 is currently shown as being drafted using a specific type of syntax, but it will be appreciated that any syntax may be used to define schema 405. In the example provided in FIG. 4, schema 405 can be viewed as a tree (to be discussed later) having 22 different nodes. One will appreciate, however, the schemas may be any size (e.g., thousands of lines of code), without limit.

Because schema 405 includes different objects, arrays, integers, strings, and so forth (e.g., potentially any number of other types of data elements) of unbounded sizes and numerical values, there are an unlimited number of ways to generate concrete input parameter values (i.e. payloads) satisfying the schema. Similarly, there are an unlimited number of ways to generate input parameter values that violate the schema. Because of the unlimited number of different ways, it is beneficial to perform intelligent techniques for exercising a service, as will be described in more detail later.

Figure 5:
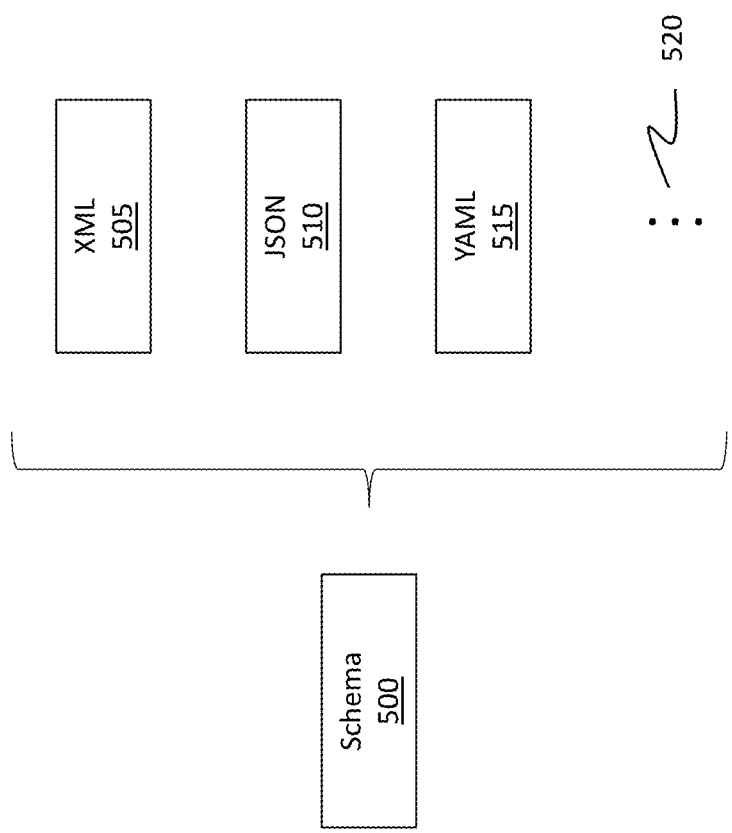
FIG. 5 illustrates how schemas may be defined using different types of languages.

Turning now to FIG. 5, there is shown an example schema 500, which is representative of schema 405 from FIG. 4. FIG. 5 shows how schema 500 may be written in any type of syntax, including, but not limited to, extensible markup language (XML) 505, JavaScript object notation (JSON) 510, or yet another markup language (YAML) 515 (also referred to as YAML Ain't Markup Language). The ellipsis 520 is provided to demonstrate how any other syntax may alternatively be used to define the schema 500.

The process of extracting the schema from the API specification may be performed in numerous different ways. For instance, some embodiments parse the API specification into keywords and then determine the schema based on the identified keywords. Some embodiments feed the API specification into a machine learning algorithm that has been trained to parse and segment API specifications into their constituent parts.

As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Figure 6:
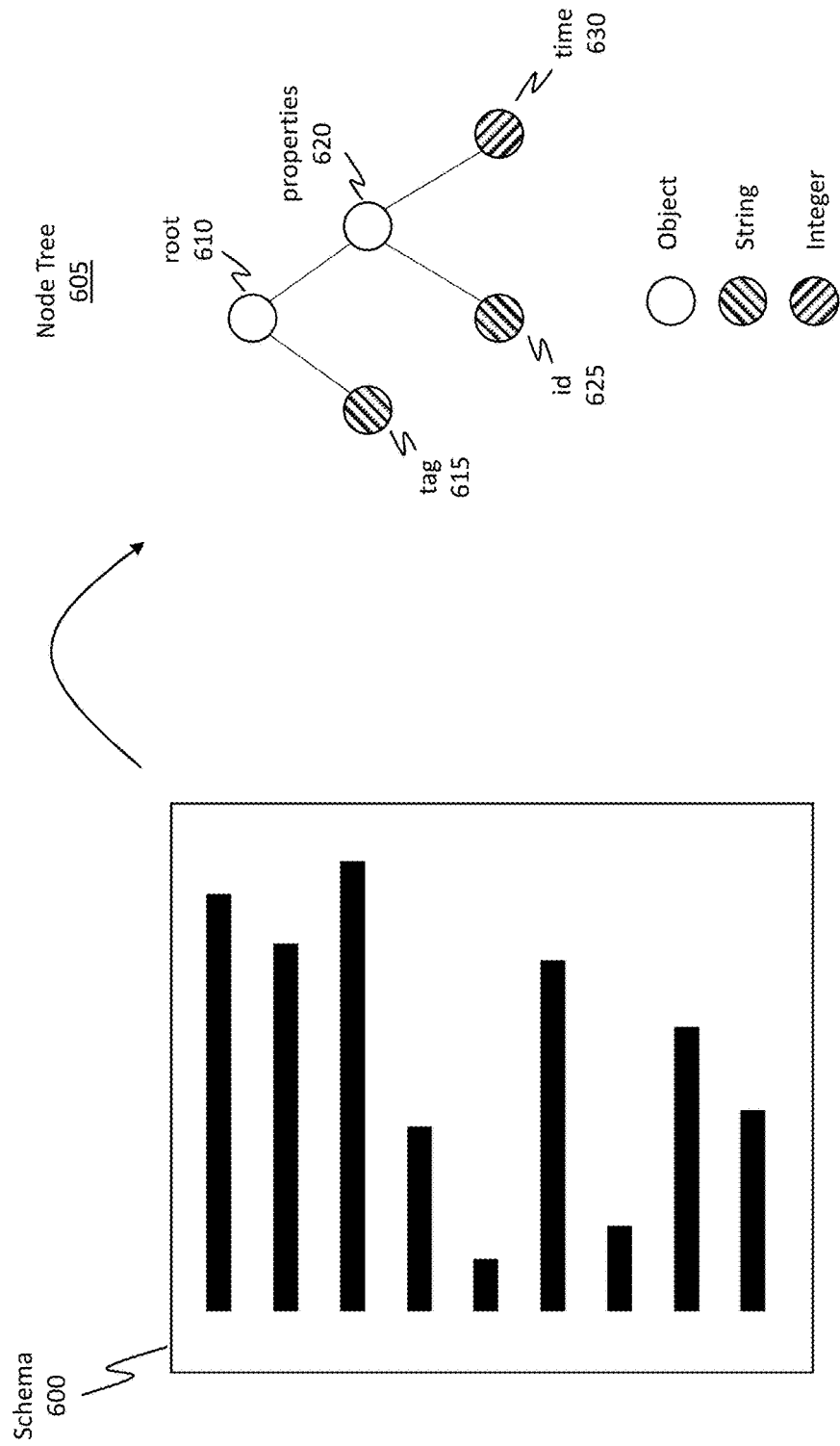
FIG. 6 illustrates how the definitions provided within a schema may be organized or represented within a node tree.

The extraction process may also involve segmenting or organizing. For instance, FIG. 6 shows an example schema 600, which is representative of the schemas discussed thus far. A request body schema (e.g., schema 600) can be encoded in different formats and may be viewed as a tree in which each node corresponds to a property field and is labeled with a type.

In FIG. 6, schema 600 has been organized to form a node tree 605 comprising any number of parent and child nodes. To illustrate, the node tree 605 includes a top-level node labeled as root 610, and then lower-level nodes labeled as tag 615, properties 620, id 625, and time 630. The different formats (e.g., empty circled, rightward slanted lines, and leftward slanted lines) are provided to illustrate the different types of data. For instance, an empty circle is representative of an object-type element, a circle with rightward slanting lines represents a string-type element, and a circle with leftward slanting lines represents an integer-type element. Of course, node tree 605 is simply provided as an illustrative example, and other types of elements and nodes may be used as well. In any event, the embodiments are able to format or segment schemas in different manners in order to extract the data therefrom.

Figure 7:
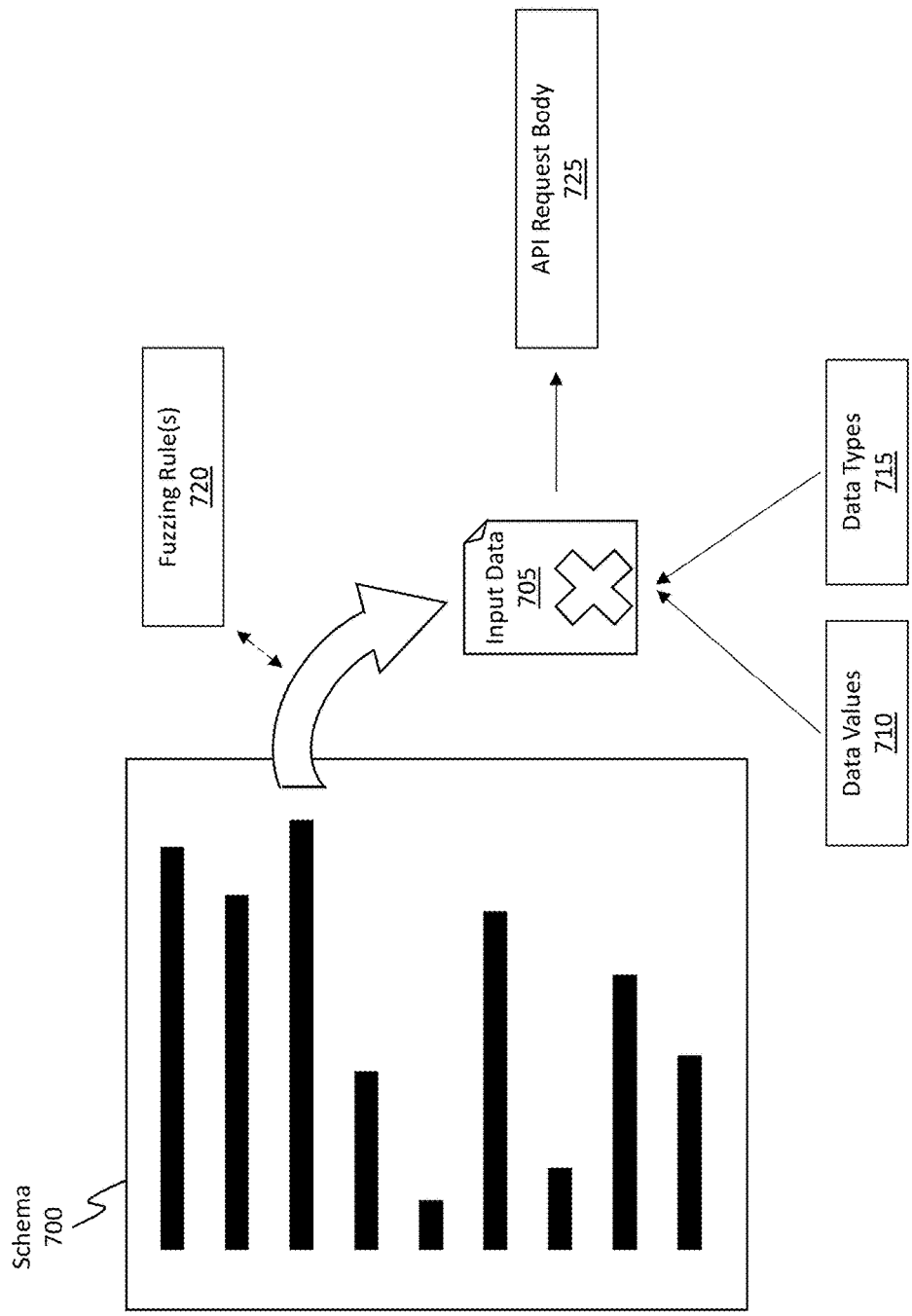
FIG. 7 illustrates how a set of fuzzing rules may be used to selectively generate and/or modify input data, which is to fed as input into a service in an attempt to exercise the service.

Returning to FIG. 1A, method 100 then includes an optional act (act 115) of generating input data (e.g., a body payload that is to be provided in a request sent to the service) by modifying or fuzzing one or more data types defined by the schema or, additionally or alternatively, by generating one or more data values used as input in the API request body. FIG. 7 provides some additional illustrations related to this method act.

In particular, FIG. 7 shows a schema 700, which is representative of the schemas discussed thus far. In accordance with the disclosed principles, the embodiments are able to selectively generate input data 705 comprising data values 710 and/or modifications to data types 715 of the schema 700. The input data 705 is then provided in an API request body 725, as described in method act 115.

The data values 710 and the data types 715 may be determined based on a set of fuzzing rule(s) 720. In particular, the fuzzing rule(s) 720 are defined to determine how to generate the input data 705. By way of example, the set of fuzzing rule(s) 720 may be used to define how to modify a node or a combination of nodes in the schema of the API, such as the nodes described in FIG. 6 (e.g., root 610, tag 615, etc.). Additionally, the set of fuzzing rule(s) 720 may further define how to select specific data values (e.g., data values 710) to be used as input in the API request body 725. In accordance with the disclosed principles, the modified nodes, data types, or input are selected to be purposefully invalid in order to trigger different types of error type responses from the service. That is, by providing invalid "fuzzed" data to the service, the service will be required to attempt to handle the invalid data. By analyzing how the service handled the data, the embodiments are then able to determine how robust the service is. A combination of the different analytics used to monitor how the service handled invalid data is generally referred to as the "error type response coverage."

Figure 8:
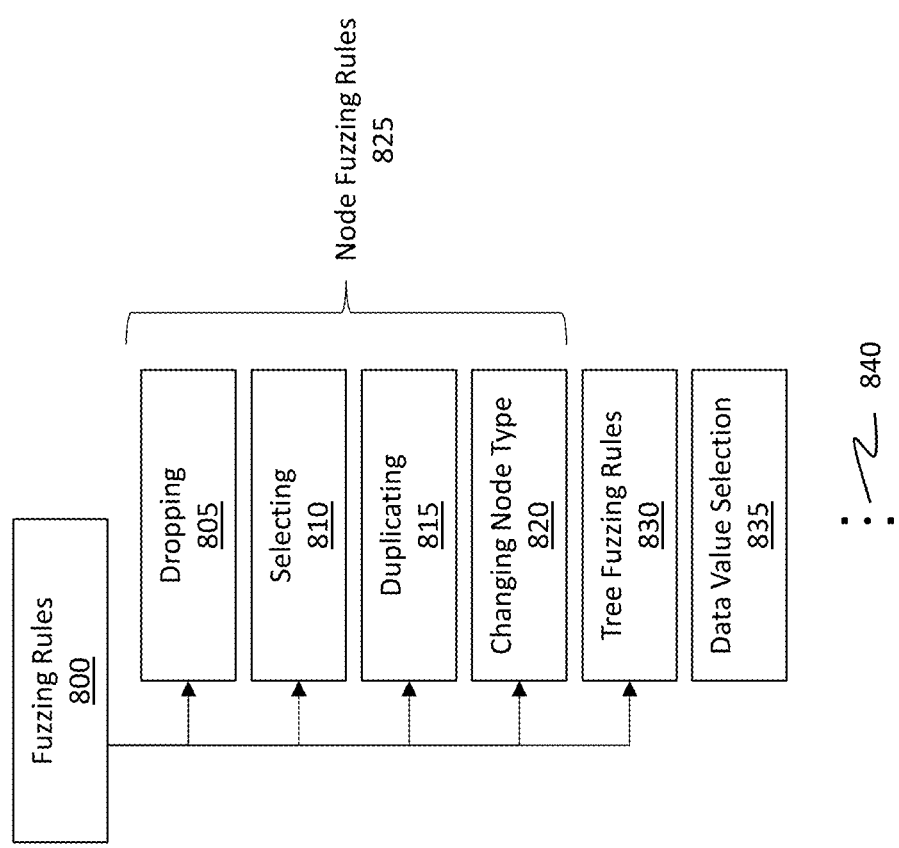
FIG. 8 illustrates different operations that may be defined and/or performed by the fuzzing rules in order to modify or "fuzz" a body of input data.

The process of modifying nodes should be interpreted broadly to include any alteration, change, or adjustment to a particular node or perhaps to proximately disposed nodes (e.g., parent nodes or children nodes). Building on that understanding, FIG. 8 shows a set of fuzzing rules 800, which are representative of the fuzzing rule(s) 720 from FIG. 7.

Fuzzing rules 800 illustrate how the process of modifying a node includes, but is not limited to, dropping a node (e.g., dropping 805), selecting a node (e.g., selecting 810), duplicating a node (e.g., duplicating 815), or changing a type of the node (e.g., changing node type 820). The combination of these different rules is labeled as node fuzzing rules 825. The fuzzing rules 800 may define other operations or procedures that may be performed to modify or fuzz data or node type/structure, as will be described in further detail later.

Attention will now be directed to FIGS. 9A and 9B, which are representative of the different modification processes discussed in connection with FIG. 8 with regard to the node fuzzing rules 825. For instance, the processes outlined in FIGS. 9A and 9B define various schema fuzzing rules that take as input a body schema (e.g., schema 405 from FIG. 4) and return a set of fuzzed schemas.

Figure 9A:
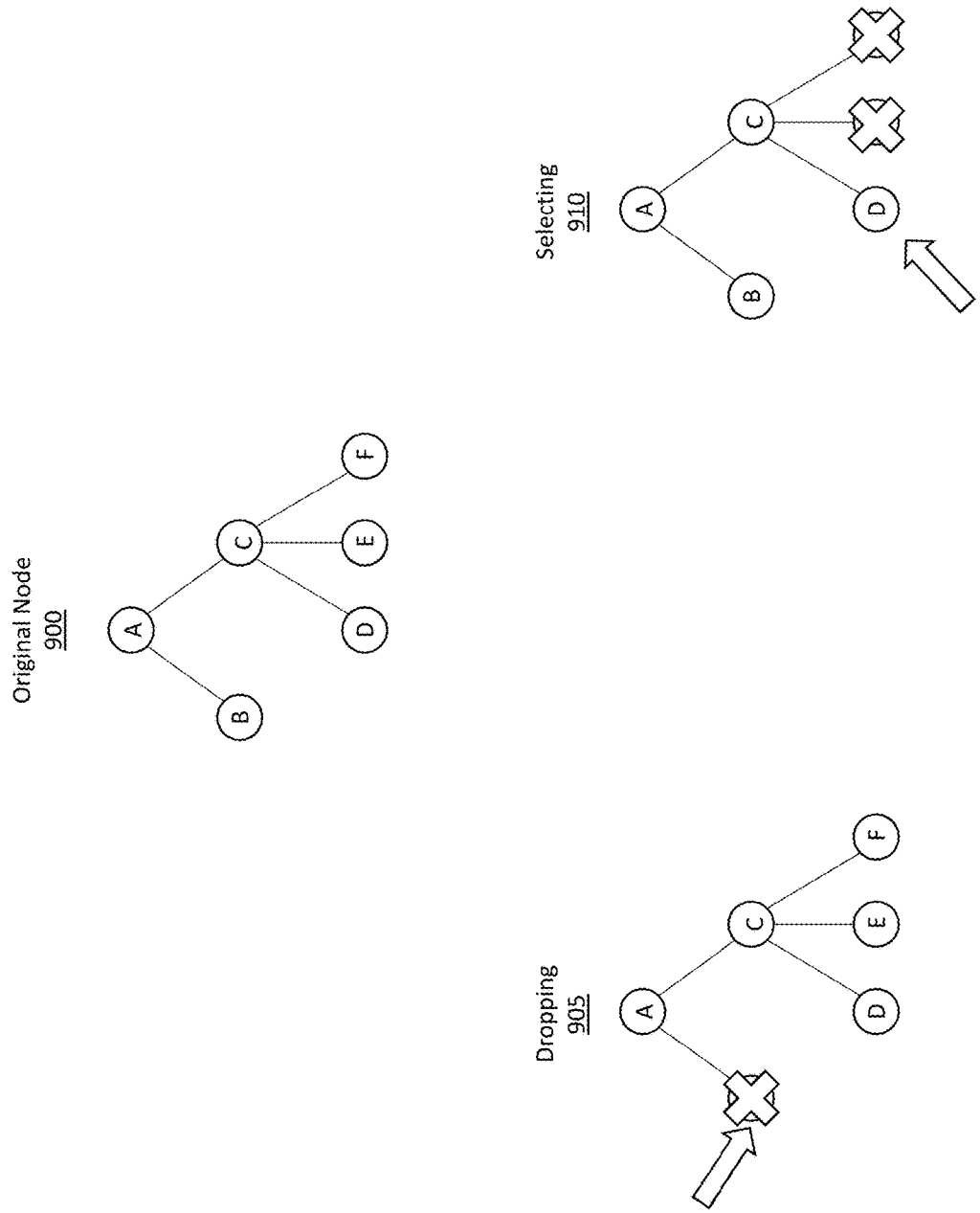
FIGS. 9A and 9B provide additional details regarding the different operations defined by the fuzzing rules.

Initially, FIG. 9A shows an original node 900 comprising nodes labeled A, B, C, D, E, and F. These different nodes are representative of the nodes discussed in connection with FIG. 6, and they may further be representative of any elements defined within any of the schemas discussed thus far.

FIG. 9A shows a dropping 905 process where, given a node defined in a schema, the node fuzzing rule dropping 905 removes one child node of a parent node while the other child nodes remain unchanged. For instance, given the parent node A in FIG. 9A, node B is dropped (as symbolized by the "x" illustration over the B node) while the other child node C remains unchanged. In this regard, the process of modifying or fuzzing the schema (e.g., to introduce invalid data to a service in an attempt to exercise the service to determine how the service handles invalid data) may include dropping a particular node.

FIG. 9A also shows a selecting 910 process where, given a node defined in the schema, the node fuzzing rule selecting 910 keeps one child node while other lateral nodes (i.e. nodes positioned at the same level in the node hierarchy) are removed. By way of example, nodes B and C are at the same level in the node hierarchy. Nodes D, E, and F are also at a common level within the node hierarchy, but this level is lower than the level of nodes B and C. In FIG. 9A, node D has been "selected." As a consequence, nodes E and F are removed.

Figure 9B:
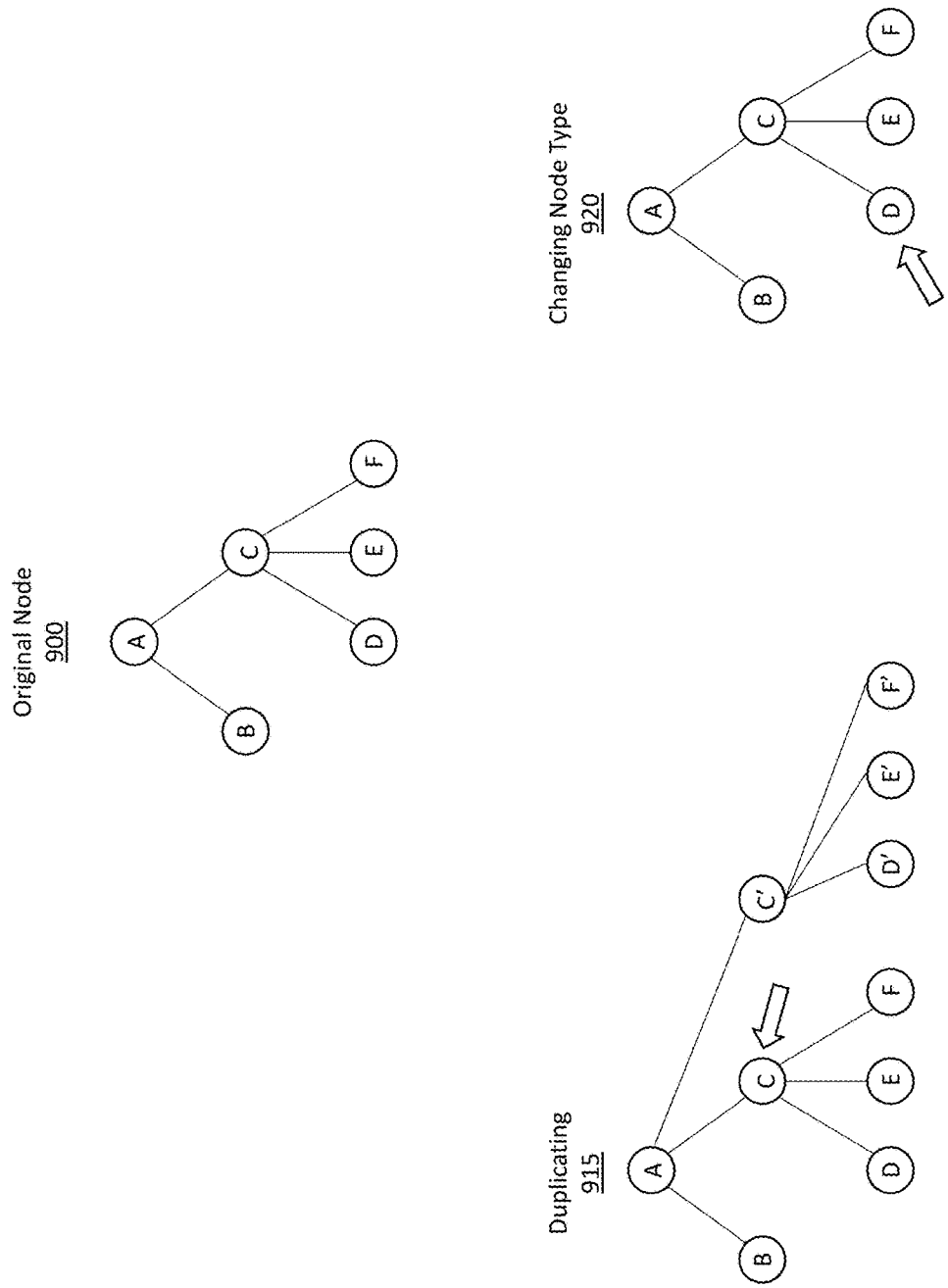

FIG. 9B shows a duplicating 915 process where, given a node defined in the schema, the node fuzzing rule duplicating 915 adds a new child node to the node tree by copying an existing child as well as the descendant nodes of that existing node. By way of example, in FIG. 9B under the duplicating 915 example, node C is selected for duplication, thereby adding node C' as well as nodes D', E', and F' to the node tree.

FIG. 9B also shows a changing node type 920 process where, given a node defined in the schema, the node fuzzing rule changing node type 920 changes the labeled type of a node. For instance, in the changing node type 920 example, node D has been selected for a type change. As an example, suppose the original type of node D was a string type. By changing the type, node D may now be labeled as an integer, a floating-point value, an array, or any other type besides the string type.

In some implementations, changing the type of a node may have side effects on the tree structure. For instance, changing an array to a string may result in the removal of all the child nodes for the modified node. In contrast, changing the type of a leaf node to (as opposed to "away from") an object or an array may preserve the tree structure, because those objects or arrays may be left empty (i.e. no child nodes would be added).

It will be appreciated that any one of the above-described schema fuzzing rules (e.g., dropping, selecting, etc.) may be applied one or more times. Additionally, any of the schema fuzzing rules may be applied in combination with any one or more other ones of the schema fuzzing rules, without limit.

Returning to FIG. 8, the fuzzing rules 800 may be used to define various structural schema fuzzing rules (e.g., as described in connection with FIGS. 9A and 9B), which modify the tree-structure or data types of structured data (e.g., JSON data) and which are generally referred to as the node fuzzing rules 825 in FIG. 8.

In addition to node fuzzing rules 825, the fuzzing rules 800 may also include certain tree fuzzing rules 830. Tree fuzzing rules 830 define how to apply a node fuzzing rule over a schema tree to produce a new fuzzed schema tree. In some embodiments, there may be at least three different tree fuzzing rules, namely: Single, Path, and All.

The tree fuzzing rule Single applies the node fuzzing rule on one single node while keeping all other nodes unchanged. The rule Single applied exhaustively on the entire schema tree will yield the smallest set of fuzzed schema variants (e.g., linear with the original schema size).

The tree fuzzing rule Path selects a path in the schema tree, selects a set of nodes on that path, and then applies the node fuzzing rule to every node in that set. This tree fuzzing rule explores more structural and type variants than Single does.

The tree fuzzing rule All selects a set of nodes in the schema tree and then applies the node fuzzing rule to every node in that set. This rule generalizes both Single and Path, but can generate exponentially many fuzzed schema variants. The dropping, selecting, etc. operations may be performed for the nodes operated on by any one of the different tree fuzzing rules 830.

The fuzzing rules 800 may also define various rule combinations, search heuristics (e.g., because rule combinations generate large amounts of fuzzed data, performing different search heuristics is advantageous), extracting data values from examples included in API specifications, and learning data values on-the-fly from pervious service responses. These aspects are discussed in more detail throughout this disclosure.

The above description focused on various techniques for modifying or fuzzing structural features of a schema. Returning to FIG. 7, these modified structural features may then be included in the input data 705 which is then included in the API request body 725.

While the above disclosure focused on various techniques for modifying schema structure, the embodiments are also able to selectively modify or generate data values 710 and include those data values 710 in the API request body 725. For instance, suppose a parameter defined in the schema 700 accepts or requires data values falling within a defined range of values. In accordance with the disclosed principles, the embodiments are able to generate modified or fuzzed data, where the data extends beyond or violates the defined range of acceptable values. The embodiments are also able to intelligently determine which data values are to be fed as input to the remote service. Additional details regarding the "intelligent" process for fuzzing data are described below.

For instance, in FIG. 8, the fuzzing rules 800 also include rules for determining data value selection 835 (i.e. determining which concrete values are to be included in the payload as input for the service). As described earlier, a body (fuzzed-)schema defines an overall tree structure and labeled types. A leaf node represents a property field that is to be rendered with a concrete value to form a complete payload/input for the service.

For example, a string-typed node location can have the value "global" or "local." This rendering process is non-trivial and may require some domain knowledge of the service under test. For instance, a specific service request with a string-typed node location might accept the value "global" but not "U.S." or "Europe", even though all of these data values are syntactically-valid string-typed values and, moreover, may be accepted in other contexts for location.

Regardless of what the tree structures and labeled types of the fuzzed-schemas are, it has been found that the service under test often rejects payloads due to a specific invalid value rendering of one single node (e.g., node "id"). This value rendering barrier can be broken down into the following root causes. (1) lack of client-specific information, such as subscription ID and resource group name; (2) lack of domain-specific information, for example, only "local" and "global" are valid location values, and a timeout value can only be a positive integer smaller than 3,600; and (3) lack of run-time dependent information, such as the name of a resource that is dynamically created by a previous request. Accordingly, the following discussion will now present a few techniques for intelligently fuzzing or modifying data values.

The simplest way of assigning a concrete value to a leaf node in a fuzzed-schema (i.e. to generate the input data) is to have a type-value mapping, which maps each type to a single value. For instance, some embodiments use the following mapping, namely: "fuzzstring", 0, false, { }, and [ ] for leaf nodes labeled with type string, integer, Boolean, object, and array, respectively. This strategy can be used by default, as a baseline, but it may not address the lack of either client-specific, domain-specific, or run-time dependent information.

Another technique for fuzzing values to generate input data is to learn from data included within past responses, and then apply that learning to new requests. For instance, the response to a valid request may contain information on the service's current state, as opposed to an error message when the request is invalid. For example, the response to a successful PUT request may contain the identification of the newly created resource (e.g., run-time dependent information). Similarly, the responses to successful GET and PATCH requests may return details of the target resources.

Unlike request examples provided in an API specification (which is based on the body schema), the responses from the service may have properties not declared in the body of the request. Often, the response schema is actually similar to the request body schema, which makes it possible to re-use response values for some parameters in the body of future requests. In other words, learning from responses may reveal the context of the current client-service interaction and potentially provides client-specific, domain-specific, and run-time dependent information.

Another technique for fuzzing values to generate input data is to use pattern matching to compare tags (i.e. a path and hierarchy status) of candidate values to the node path in the fuzzed-schema tree structure. Two levels of precision are often considered: (1) conservative and (2) aggressive.

When in conservative mode, a candidate value is chosen for a node "n" only if its tag exactly matches the node path of "n" in the fuzzed-schema. For example, given a node n-type in the fuzzed-schema, the candidate value "Public" may be selected only if its parent is $n_{properties}$ and there are no other parents. On the other hand, under aggressive mode, only the last level (leaf) in the hierarchy is compared. For example, as long as a candidate value has a tag suffixed with type, it will be chosen for the node $n_{type}$, regardless of the parent nodes.

Any number or combination of the above techniques may be used to selectively generate values to serve as input. Provided below is a list of a few additional example techniques for fuzzing data values to generate input data.

1. Baseline (BAS): Select a value for a node using only the type-value mapping, as described above.

2. Examples only (EXM): Select a value for a node by using examples outlined in an API specification, or, alternatively, by using the type-value mapping if no example is available.

3. Responses only (a conservative approach) (CON): Select a value for a node using the responses in conservative mode, or, alternatively, use the type-value mapping if no candidate value is available.

4. Responses only (an aggressive approach) (AGG): Select a value for a node using the responses in aggressive mode, or, alternatively, use the type-value mapping if no candidate value is available.

5. Responses (conservative) and examples (CON+EXM): Select a value for a node using the responses in conservative mode, or, alternatively, use examples if no candidate value is available; otherwise, use the type-value mapping.

6. Responses (aggressive) and examples (AGG+EXM): Select a value for a node using the responses in aggressive mode, or, alternatively, use examples if no candidate value is available; otherwise, use the type-value mapping.

Accordingly, any number or combination of the above techniques may be used to intelligently fuzz data. Of course, other techniques may be used as well. For instance, any type of machine learning algorithm may be used to generate fuzzed data. Returning to FIG. 8, the ellipsis 840 is provided to symbolically illustrate how other types or fuzzing rules may be included among the fuzzing rules 800. By way of example, some embodiments use grammar-based fuzzing techniques, which allows different complex grammars to be generated using different text and binary data formats. Accordingly, the disclosed principles should be interpreted in a broad manner. In this regard, the embodiments are able to generate input data by modifying data types and/or by generating data values.

Returning to FIG. 1A, method 100 then includes an act 120 of generating an API request body (e.g., the API request body 725 of FIG. 7) for the API of the remote service. This API request body includes the input data that was previously generated (e.g., in act 115).

Thereafter, method 100 includes an act (act 125) of transmitting the API request body to the remote service in order to exercise the remote service. This exercise process is performed in an attempt to identify a programming deficiency of the remote service using the input data. For instance, turning briefly to FIG. 2, source code 235 is shown as including a programming deficiency 260. It will be appreciated that this programming deficiency 260 may be any type of bug, exception, error, or deficiency, without limit.

For instance, the source code 235 may be have a race condition, or a memory leak, an exception at a particular line of code, or it may crash when a particular type of invalid data is received (as opposed to executing error handling code so as to prevent the service from crashing). Often, applications and services have many bugs, some of which may not be discovered for a long time or until the service is in operation. One beneficial feature of the disclosed embodiments is the ability to root out programming bugs in source code and to trigger the performance of a remedial action to resolve or correct the bug. Accordingly, the API request body, which now includes fuzzed or modified data (i.e. data specifically selected or generated in an attempt to break the service), is transmitted to the service in order to test and exercise the service in an attempt to identify bugs.

Because the service is remote and because access to the underlying source code is often now unavailable, client-side developers may no longer be able to use traditional techniques to conduct code coverage testing. Notwithstanding the unavailability of direct access to source code, the disclosed embodiments are nevertheless still able to test a service to measure or gauge its error type response coverage, as will be described in more detail to follow.

Figure 10:
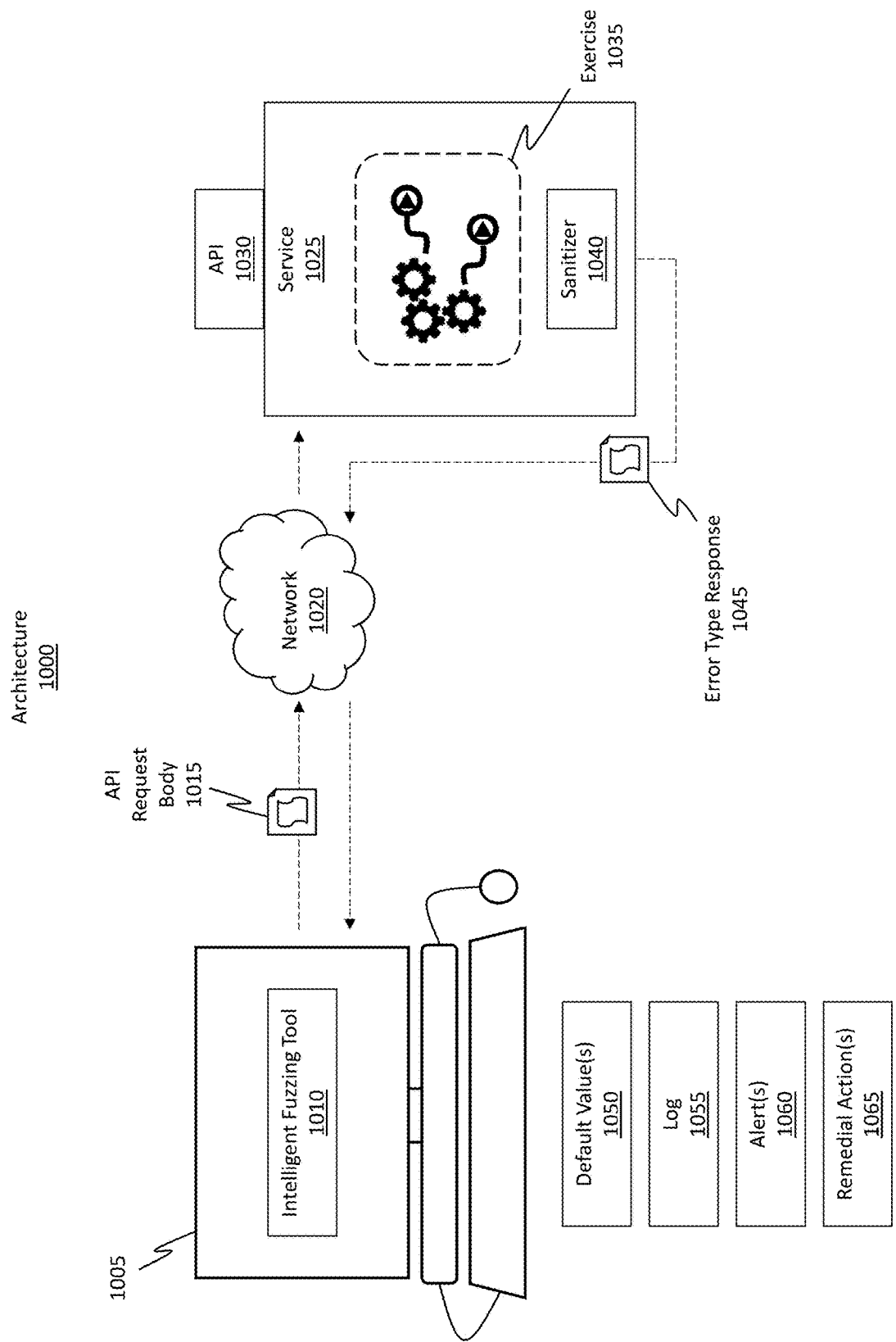
FIG. 10 illustrates an example architecture in which an API request body, which includes fuzzed or modified input data, is transmitted to a remote service and in which the remote service provides an error type response detailing how the remote service handled the input data.

FIG. 10 provides a beneficial visualization of the operations performed in connection with method acts 120 and 125 discussed above. In particular, FIG. 10 illustrates an example architecture 1000, which is similar to the architecture 200 of FIG. 2 and which is representative of some of the method acts discussed in method 100 of FIGS. 1A, 1B, and 1C.

Architecture 1000 is shown as including a client-side computer system 1005 and an intelligent fuzzing tool 1010, both of which are representative of the computer systems and intelligent fuzzing tools discussed thus far. In accordance with the disclosed embodiments, the intelligent fuzzing tool 1010 is able to generate input data (i.e. body payload data) and an API request body 1015, which is representative of those API request bodies discussed thus far. API request body 1015 is then transmitted over a network 1020 to a remote service 1025, which is associated with a corresponding API 1030.

Upon receiving the API request body 1015, the service is able to extract the data values and identify the data types embedded or included within the API request body 1015. Because the data values and data types have been modified or fuzzed in a purposeful manner so as to be invalid (i.e. beyond the scope defined in the schema of the API 1030's API specification), the service 1025 will likely not be able to perform normal operations on the incoming input data. Instead, the service 1025 will be exercised (as shown by exercise 1035) in which the service 1025 will attempt to handle the invalid data. If the service 1025 includes error exception handling code pertinent to the input data, then the service 1025 may be able to adequately respond to the invalid input data with a predefined error code or message. On the other hand, if the service 1025 does not include error exception handling code pertinent to the input data, then the service 1025 may not be able to adequately respond to the invalid input data and thus may throw or issue an irrelevant error code or message or worse the service may crash. In cases where the service 1025 includes a programming deficiency (e.g., an inability to handle the data), the service 1025 may simply throw a generalized error message or perhaps a relevant error message. In any event, the error code or message may be returned to the client-side computer system 1005.

In some cases, the service 1025 may include a sanitizer 1040 tasked with sanitizing or removing certain personally identifiable information (PII) from the error codes or messages prior to permitting the error codes or messages from leaving the service 1025's control. For instance, the resulting error type response may be sanitized prior to being received by the computer system 1005. Sanitizing the error type response may include extracting, stripping, or otherwise preventing at least the following types of information from being included in the error type response when it is transmitted to the computer system 1005: timestamp data, session identification, or a globally unique identifier (GUID). Accordingly, the embodiments are able to transmit the API request body to the remote service to exercise the remote service in an attempt to determine how the remote service handled the specifically customized input data.

Returning to FIG. 1A, method 100 additionally includes an act (act 130) of receiving an error type response from the remote service. This error type response indicates how the remote service handled the input data. For instance, the error type response may include specific error codes, error messages, and/or error types. Such an operation is shown in FIG. 10 by the service 1025 transmitting error type response 1045 to the computer system 1005.

It should be noted that in some cases, the original input data transmitted in the API request body 1015 of FIG. 10 may be based on a determined set of default value(s) 1050 outlined either in an API specification or perhaps received in response to one or more queries or requests sent to the service 1025 (as was described earlier). For instance, in some cases, a response from the service 1025 may detail default value(s) 1050 the service is programmed to use. Accordingly, the embodiments are able to initially use the default value(s) 1050 as a baseline value and then fuzz or modify these default value(s) 1050.

Additionally, it should be noted that the embodiments are able to maintain a log 1055 recording the computing processes performed in connection with the disclosed operations. This log 1055 may be configured to be an auditable record detailing the operations that the computer system 1005 and the service 1025 performed. In this regard, the log 1055 may be maintained to track interactions between the computer system 1005 and the remote service 1025. If the log 1055 is queried, specific sections of the log 1055 may be returned as a response to the query or, alternatively, the entire log 1055 may be provided as a response. In any event, the data included in the log 1055 may be used to facilitate identifying programming deficiencies and further facilitate debugging those deficiencies.

If the embodiments do identify a bug or programming deficiency in response to analyzing the error type response 1045, then the embodiments are able to trigger alert(s) 1060 and perhaps trigger any number of remedial action(s) 1065. Further detail on these aspects will be provided later.

Figure 11:
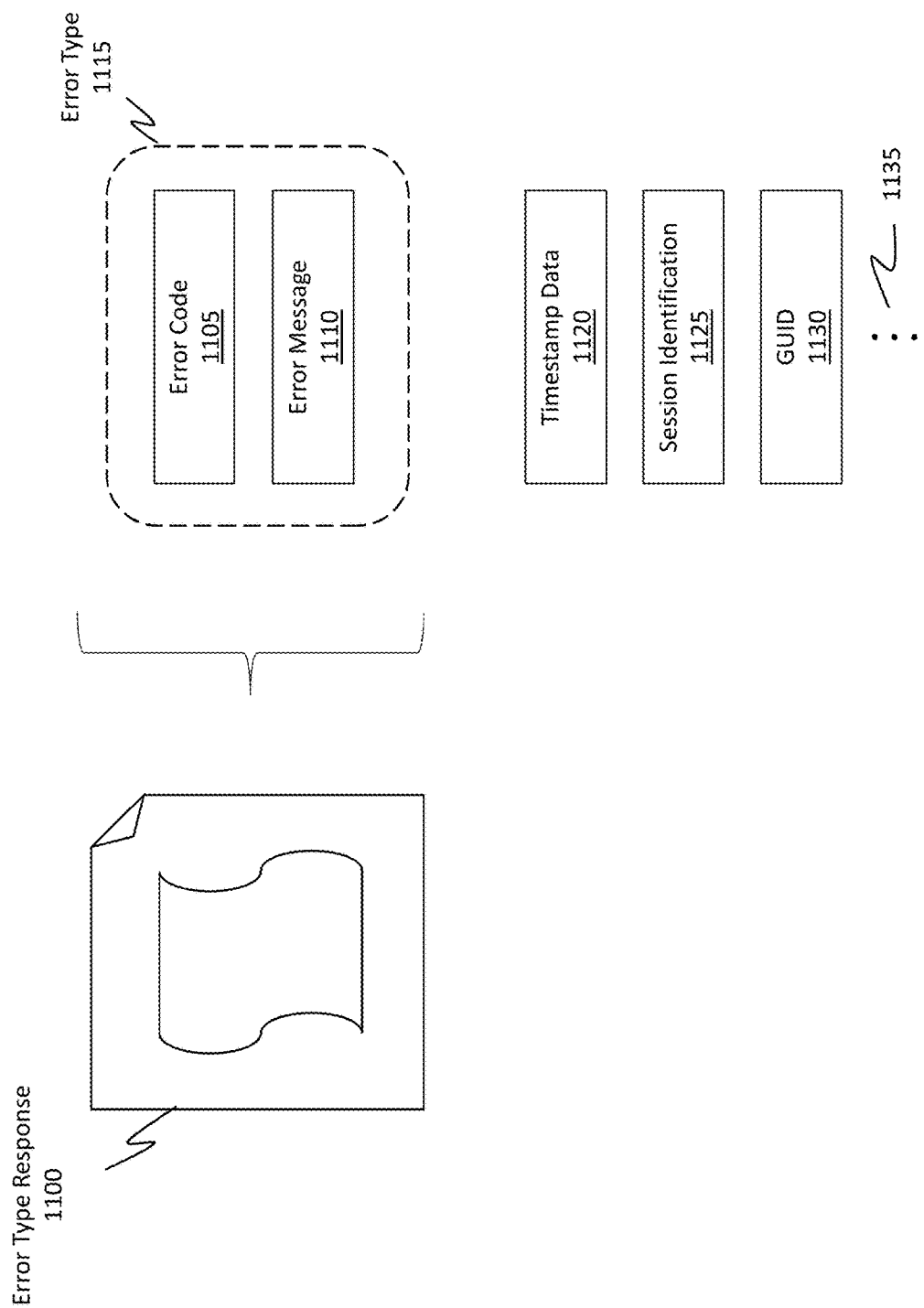
FIG. 11 illustrates some information that may be included or prevented from being included in the error type response.

Method 100 continues in FIG. 1B where, after receiving the error type response from the service, method 100 includes an act (act 135) of using the error type response to determine an error type response coverage of the remote service. FIG. 11 provides some additional detail regarding how the embodiments determine this so-called error type response coverage.

Initially, FIG. 11 shows an example error type response 1100, which is representative of the error type response 1045 from FIG. 10. As shown, the error type response 1100 may be configured to include one or more of an error code 1105, an error message 1110, or even an error type 1115, which is a combination of the error code 1105 and the error message 1110 (i.e. an error code and error message pair).

As used herein, error code 1105 is a particular number identifying which error the remote service (e.g., service 1025 from FIG. 10) encountered while operating using the received input data. Because the received input data was purposely designed to be invalid, the service was tasked with attempting to handle the invalid data. If the service was programmed to handle the invalid data in a particular manner, then the service will issue a particular error code identifying the error that occurred while processing the invalid data. On the other hand, if the service was not programmed to handle the invalid data, then a generalized error code may be issued.

Accordingly, when a service fails to process a request, it returns an error code to notify the client of this failure. With regard to REST APIs, a REST API request may return an HTTP status code, which is in the 40× range when the failure is triggered by an invalid yet handled request, or in the 50× range for unhandled conditions or generic failures to process the request. In addition, a service may define its own finer-grained error code that includes domain-specific information.

One benefit of the disclosed embodiments relates to the ability to test or exercise a service in an attempt to identify whether the service has been adequately programmed to handle numerous different types of invalid data. This concept (i.e. determining whether the service is able to handle different types of invalid data) is the so-called "error type response coverage." To clarify, "error type response coverage" generally refers to an extent or degree by which a service is able to handle different types of invalid data by throwing specific errors in response to that invalid data.

Relatedly, error message 1110 is a descriptive message describing an unexpected condition the service encountered (e.g., in response to invalid data or an incorrect instruction) as well as potentially a detailed description of the specific error that occurred. Often, error message 1110 includes ASCII text describing the unexpected condition. Therefore, in addition to an error code, a response for a failed request will often include an error message. This message is valuable in that it further describes how the payload was attempted to be processed, especially when the same error code was used for many invalid requests. The error message provides additional context for different errors, some of which may not be distinguished by using only their error codes.

Prior to being sent to the client-side computer system, in some cases, the error type response 1100 may include timestamp data 1120, session identification 1125, or a GUID 1130. In some cases, additional PII may be included in the error type response 1100, as symbolically shown by the ellipsis 1135. As described earlier, however, the embodiments are able to strip or sanitize such information from the error type response 1100 such that PII is prevented from being delivered to the client-side computer system.

The embodiments are configured to collect, aggregate, or otherwise compile any number of different error type responses and link, document, or correlate each error type with the specific invalid data that was used to trigger the error type response. For instance, the embodiments may maintain a database or other type of data storage repository listing each error type response along with its corresponding set of invalid data. For instance, suppose a set of invalid data "A" triggered error type response "A1" and invalid data "B" triggered error type response "B1." The embodiments are able to track and monitor these correlations.

Because the service is remote relative to the intelligent fuzzing tool, the tool is not able to directly determine code coverage. Instead, the tool is configured to determine coverage by sending queries or requests to the remote service and analyzing the responses received from the service to determine how robust the service is when it receives invalid data. By analyzing the different error type responses, the embodiments are able to systematically build a profile of the service, where the profile is reflective of how the service operates when faced with invalid data. This profile is referred to as the error type response coverage.

Figure 12:
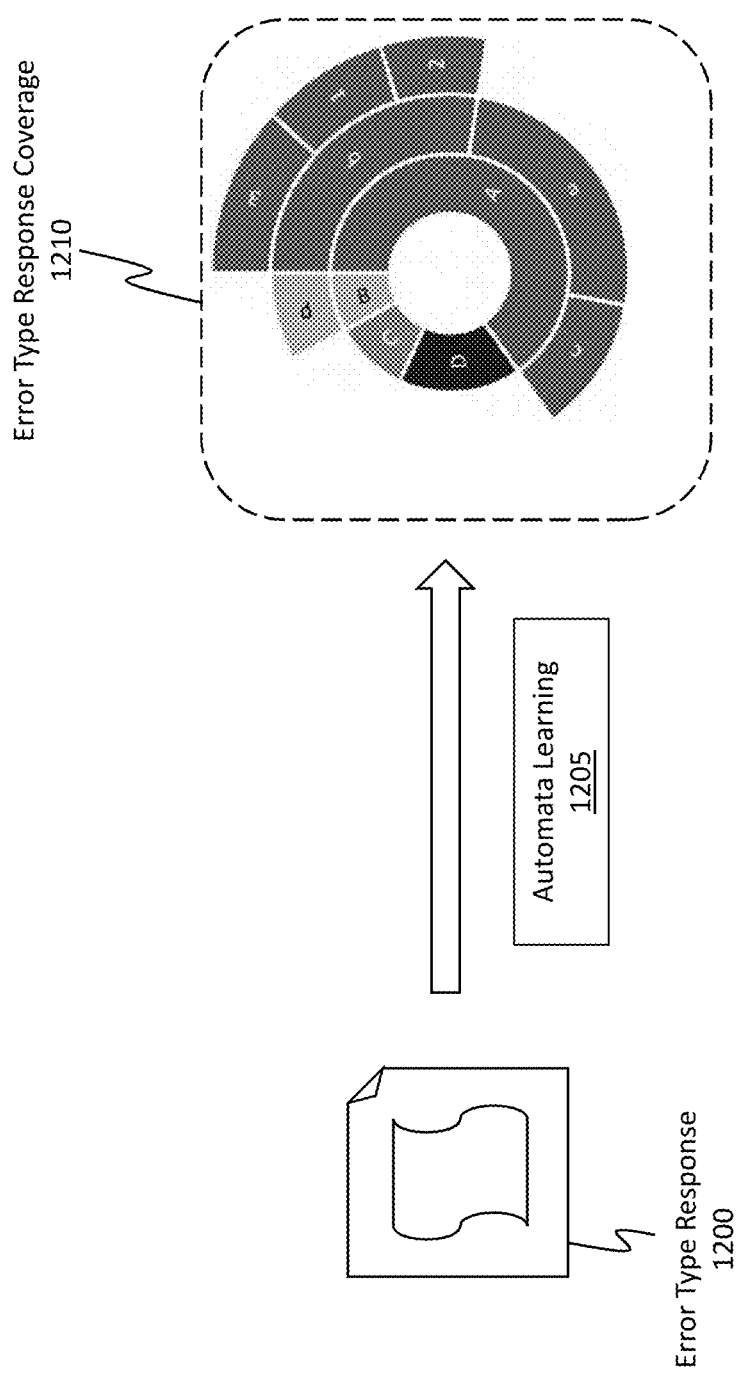
FIG. 12 illustrates an example of how the error type response may be used to map or otherwise generate an error type response coverage of the service, which coverage is determined based on the modified input provided to the service and is further based on the error type response provided by the service.

FIG. 12 provides some additional description regarding the error type response coverage. Initially, FIG. 12 shows an error type response 1200, which is representative of the error type response 1100 from FIG. 11 as well as the other error type responses mentioned herein. The disclosed embodiments are able to use any type of machine learning or automata learning 1205 in facilitating the determination of the error type response coverage 1210 of a remote service. For instance, automata learning 1205 may be used to intelligently select or generate the different types of input data to be fed into the remote service. The process of expanding the error type response coverage 1210 is directly dependent on the types of responses received from the service, and the types of responses are dependent on the types of input data. As a consequence, the automata learning 1205 influences how the error type response coverage 1210 is expanded.

Generally, automata learning 1205 is a type of machine learning technique in which a current process or action is performed based on a set of previous actions or experiences that were performed. In some cases, automata learning 1205 is a type of reinforcement learning and is based on various different states or statuses of data. As will be described in more detail later, the embodiments use automata learning 1205 techniques to select new invalid data to feed to the remote service in an effort to continue to expand the growing profile or error type response coverage 1210 the embodiments are learning about the remote service.

FIG. 12 shows the error type response coverage 1210 in the form of a sunburst chart. One will appreciate, however, that such a visualization is for example purposes only, and the embodiments are not limited to visualizing the error type response coverage 1210 in this manner. Indeed, the coverage may be visually displayed using any known technique, or, alternatively, the coverage may not be visually displayed.

In any event, the sunburst chart is provided to symbolically represent the error type response coverage 1210 of a remote service (e.g., service 1025 from FIG. 10). To build the error type response coverage 1210, the embodiments repeatedly transmit invalid input data to the remote service and then analyze the error type responses. The sunburst chart of FIG. 12 comprises the following data values: A, B, C, D, a, b, c, d, 1, 2, and 3. These letters and numbers are provided for example purposes only. Generally, these letters and numbers reflect coverage areas where the remote service has been provided invalid data and exercised using that invalid data. Additionally, these letters and numbers reflect the error type responses received from the remote service.

As shown, the upper right-hand area of the sunburst chart is filled in with numerous letters and numbers. In contrast, the left-hand area of the sunburst chart is relatively less filled in. The symbolic "filling in" of the sunburst chart represents that there are still large areas of the service that have not been exercised using invalid data. As a consequence, the profile or error type response coverage 1210 of the remote service is still rather limited.

It is desirable to expand an understanding of how the remote service handles invalid data (i.e. the error type response coverage 1210) because doing so will facilitate the operation of identifying bugs and programming deficiencies. For instance, if the service is never tested in a particular area (e.g., by receiving a specific type of invalid input data), then developers may not know whether or not the service is adequately programmed in that area. In the event that a client eventually does submit invalid data focused on that unknown area or functionality of the service, there is a chance the service may encounter an error and the client's interaction with the service may be impaired. Accordingly, it is beneficial and desirable to test a service to measure or gauge its robustness with regard to handling invalid input data.

Returning to FIG. 1B, method 100 includes an act (act 140) of expanding the error type response coverage by repeatedly performing a number of operations until a threshold metric associated with the error type response is satisfied. In some embodiment, the threshold metric may be a determined number of testing runs in which invalid data is sent to the remote service. For instance, a selected number of testing runs may be performed for a specific type of request (e.g., perhaps 1,000 tests per request type).

In some cases, the threshold metric may be a duration of time in which testing is permitted to be performed. For instance, the duration may be a selected number of minutes, hours, days, or perhaps even weeks. Once the duration is reached, then the testing may be ended.

In some embodiments, the threshold metric may be an amount of compute resources that are expended. For instance, the threshold metric may be based on a determined number of processor cycles or perhaps number of threads used. In some cases, the testing may be performed as a background process and may continue so long as a percentage of the total amount of available compute power used by the testing falls below a threshold percentage level. If the testing requires additional computation power, then the testing may be postponed until a later time. Accordingly, any defined metric may be used as the threshold metric described above.

In response to learning how previously-used input data (e.g., perhaps the input data 705 from FIG. 7) impacted, altered, or otherwise changed the error type response coverage (e.g., error type response coverage 1210 in FIG. 12), method 100 in FIG. 1B is shown as including an act (act 145) of selectively generating new input data. This new input data is selectively generated in an attempt to elicit (e.g., from the remote service) a new error type response that is nonoverlapping with previous error type responses. The process of "learning" how the previously-used fuzzed or modified data impacted the error type response may be performed using any of the disclosed automata learning techniques mentioned herein. By "impact," it is meant that the error type response coverage either changed in some manner (e.g., was enlarged or perhaps reduced in size) or, alternatively was not changed in any manner (i.e. it stayed the same size).

In order to expand the error type response coverage, new and different types of error type responses are needed from the remote service. To clarify, if only the same error type responses were always received from the remote service, then the amount of information that can be obtained from that error type response will be limited. If the error type response coverage is to be expanded, then new error type responses will need to be elicited from the remote service. To elicit these new responses, the embodiments perform intelligent processes in selecting which types of invalid input data (i.e. fuzzed data) are to be fed to the service. The previous sections of this disclosure focused on various techniques for intelligently fuzzing data to serve as input data for a service.

Method 100 then includes an act (act 150) of transmitting a new API request body, which comprises the new input data, to the remote service to exercise the remote service using this new input data. Then, there is an act (act 155) of receiving a new error type response from the remote service. This new error type response indicates how the remote service handled the new input data. As shown by FIG. 1B, the method may then repeat certain acts in an attempt to expand the error type response coverage of the remote service. FIGS. 13, 14, 15, and 16 are representative of these different method acts, which are performed in an effort to expand the error type response coverage.

Figure 13:
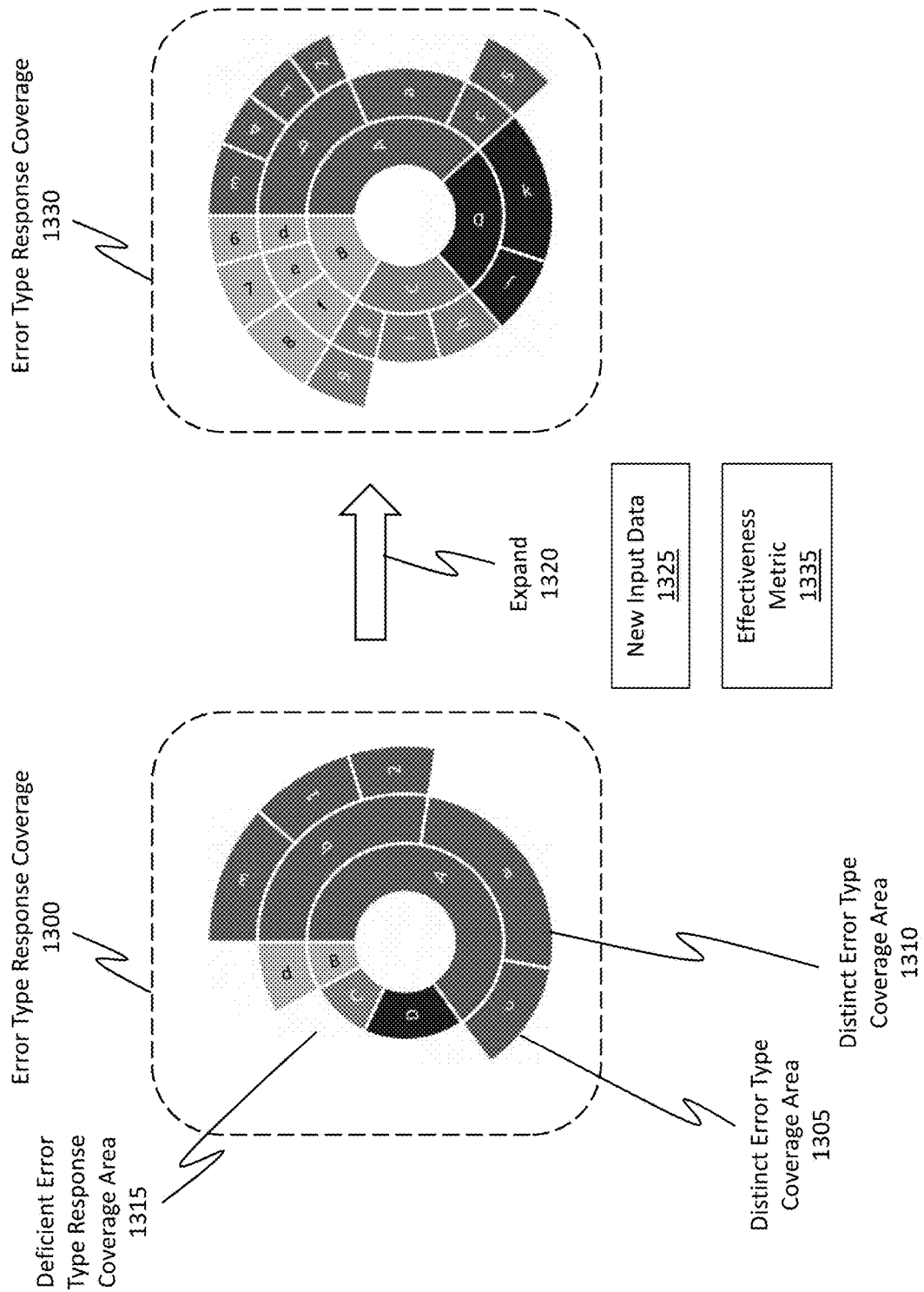
FIG. 13 illustrates how it is desirable to progressively expand the error type response coverage to identify coverage areas that have not been tested or that are indicative of a programming deficiency (e.g., a "bug") in the service.

FIG. 13 shows an example error type response coverage 1300, which is representative of the error type response coverage 1210 of FIG. 12. This error type response coverage 1300 is shown as including a number of distinct error type coverage areas 1305 and 1310 corresponding to a functionality area of the service that has already been tested to determine how it handles invalid input data. Error type response coverage 1300 also shows a deficient error type response coverage area 1315, which is representative of a functional area of the service that has not yet been tested or has not yet been tested a sufficient or threshold amount to determine how those functional areas of the service handle invalid input data. It is desirable to test the service to determine how the service handles invalid input data in those functional areas identified as being deficiently tested.

To clarify, the process of selectively generating new input data to elicit (e.g., from the remote service) a new error type response that is nonoverlapping with previous error type responses may include identifying a specific error type response coverage area of the remote service to exercise. For instance, the deficient error type response coverage area 1315 may be the area to be tested. The embodiments may then generate new input data based on this specific error type response coverage area. For instance, the area may be associated with a particular function of the service. By consulting the API specification, the embodiments are able to identify which inputs are applicable to trigger the performance of that particular function. After identifying these inputs, the embodiments may then generate fuzzed or modified input data to serve as input parameters to trigger the performance of the particular function. In this regard, the embodiments can specifically target particular coding functions associated with the service in order to expand the error type response coverage, which describes the input handling capabilities of the service.

That is, it is desirable to expand 1320 the error type response coverage 1300 by testing the remote service. To do so, the embodiments selectively generate or design new input data 1325 that is designed in an attempt to elicit or trigger new error type responses from the remote service. In some cases, the new input data 1325 is designed in an attempt to reach "deeper" or hierarchically "lower" child nodes (e.g., in FIG. 9A, nodes D, E, and F are hierarchically lower than node A), child resources, or deeper service states of the service. For instance, given a fuzzed schema, a payload or "new input data" (e.g., new input data 1325) is rendered or generated by filling in concrete values. In some cases, these values are based on the labeled type of each node in the tree.

As the remote service is fed the new input data 1325, the coverage area of the error type response coverage 1300 will expand as additional insight and understanding regarding the operational abilities of the remote service is learned and identified. For instance, in response to repeatedly testing, probing, and exercising the remote service across its different functional areas, the error type response coverage 1300 will be expanded, as shown by the expanded version illustrated by error type response coverage 1330. As shown, the error type response coverage 1330 is more "filled in" than the error type response coverage 1300. This "filling in" symbolically represents how the remote service is repeatedly tested over time to enable the embodiments to learn how the remote service handles invalid data across the remote service's different functions.

Some embodiments rely on an effectiveness metric 1335 in determining how effective the new input data is in expanding the error type response coverage. For instance, if the new input data successfully elicits a new error type response (e.g., perhaps one that was not previously received from the remote service), then it can be determined that the new input data was effective in expanding the error type response coverage. On the other hand, if the new input data triggered an error type response that has already been received, then it may be the case that the new input data was not effective. If a threshold number of successively transmitted input data causes only non-new error type responses (i.e. ones that have already been received) to be received, then the effectiveness metric 1335 may indicate that the current train of input data or train of modification techniques are not effective, and the fuzzing or modification techniques should be altered. Accordingly, by tracking the effectiveness metric 1335, the embodiments can identify trends with regard to whether or not the generated input data is effective or successful in expanding the error type response coverage.

The effectiveness metric 1335 may be provided in any form. For instance, the effectiveness metric 1335 may be in the form of a percentage where higher percentages indicate relatively improved effectiveness while lower percentages indicate relatively worse effectiveness. The effectiveness metric 1335 may be in the form of a letter grade (e.g., A, B, C, D, and F, where A reflects improved effectiveness while F indicates worse effectiveness). The effectiveness metric 1335 may be determined periodically in accordance with a defined schedule (e.g., every selected number of seconds, minutes, hours, or days) or the effectiveness metric 1335 may be computed or reevaluated after each response from the service is provided. Some embodiments reevaluate the effectiveness metric 1335 after a batch or group of a selected number of responses are received from the service.

In some embodiments, an error type response includes an error type (i.e. a pair of error code(s) and error message(s)). A number of distinct error types that are received in response to fuzzed data may be used to determine the effectiveness metric 1335 for expanding the error type response coverage. In this regard, both the error code and the error message may be required to be distinct in order for the effectiveness metric 1335 to reflect an improved or a positive impact on the error type response coverage.

Figure 14:
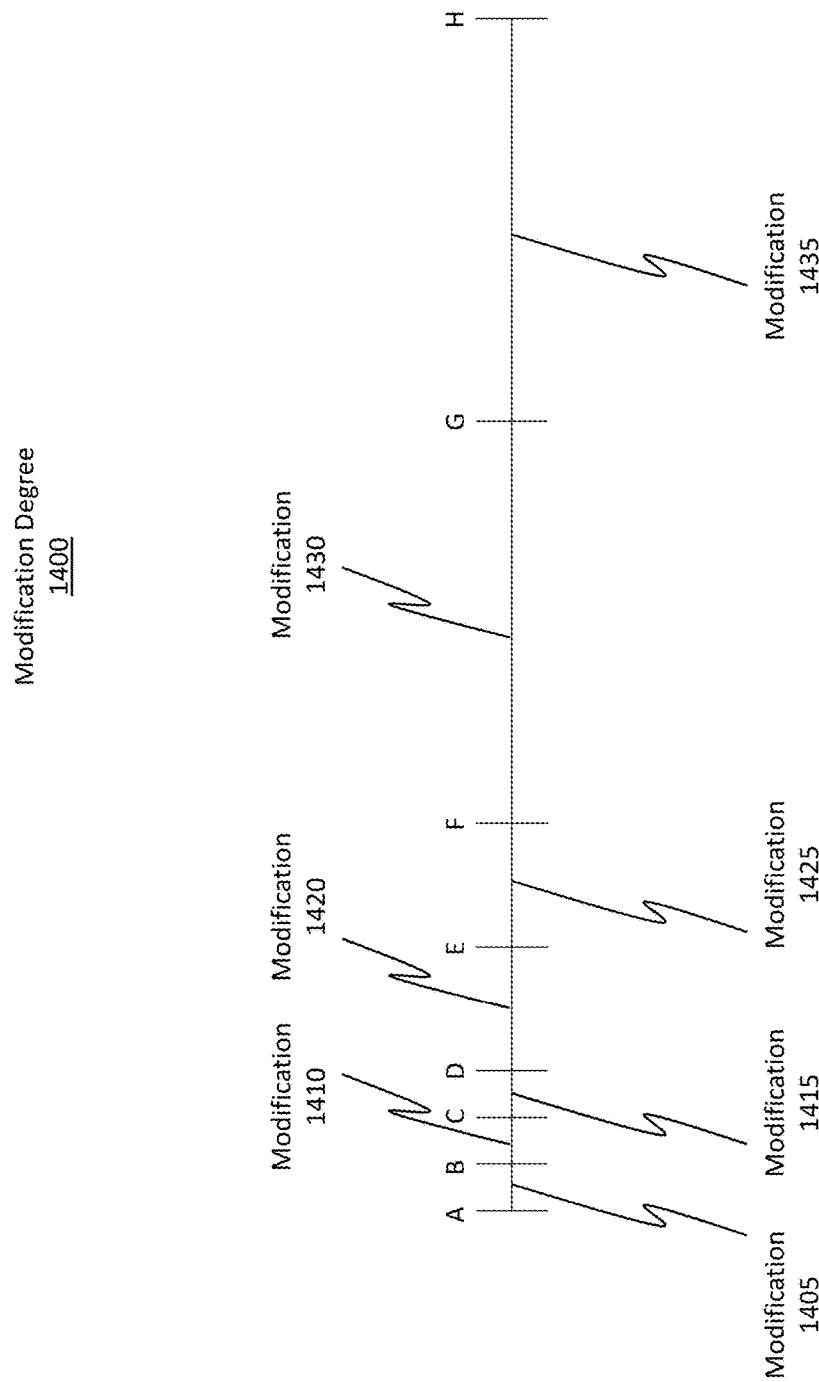
FIG. 14 illustrates how a tiered, managed, or progressively incremental approach may be followed when determining an amount or a level of modification that is to be performed during successive modification runs. This progressively incremental approach may also be in the form of a pipeline comprising sequentially-applied modifications.

FIG. 14 illustrates one example technique for modifying or fuzzing data in an attempt to elicit new error type responses from the remote service. In particular, FIG. 14 shows a so-called modification degree 1400 representing a progressively incremental approach or a sequential pipeline approach to modifying data.

By way of example, FIG. 14 shows a first set of invalid data (which was purposefully generated) labeled "A." This data is fed as input into the remote service. In this example, input A failed to cause the remote service to trigger a new error type response (i.e. the service returned an error type response that has already been received by the intelligent fuzzing tool). In response, the embodiments are able to take input A and perform an additional modification 1405 to the input. For instance, the embodiments may provide a new data value or may perform any of the operations discussed in connection with the fuzzing rules 800 outlined in FIG. 8.

As symbolized in FIG. 14, modification 1405 may be a relatively small or minor modification and may produce input B.

Input B may then be fed as input to the remote service. If input B also fails to produce a new error type response, then another relatively small or minor modification 1410 may be made to generate input C. In this example, input C also failed to produce a new error type response. As a consequence, another modification 1415 may be applied to generate input D. Here, input D also failed to trigger a new error type response.

At this point, the intelligent fuzzing tool may recognize that the relatively small or minor modifications (e.g., modifications 1405, 1410, and 1415) are not eliciting new error type responses from the remote service. In view of this recognition, the intelligent fuzzing tool may elect to make a more drastic or impactful change/modification to the data. For instance, the intelligent fuzzing tool may make modification 1420, which is shown as being "longer" (i.e. more impactful) than the previously performed modifications. An example of a more impactful modification may include simultaneously performing multiple different modifications at once. Or rather, the embodiments may apply a combination of multiple different changes to a set of input data to render that input data invalid. As an example, the embodiments may not only modify a data value, but they may additionally modify one or more of the nodes in the node tree (e.g., in the manner described earlier in connection with FIG. 8). Combinations of multiple modifications may constitute more impactful changes.

In this case, the modification 1420 resulted in the generation of input E. Input E is then fed as input to the service. Here, input E also failed to elicit a new error type response from the remote service. As a consequence, the intelligent fuzzing tool made another modification 1425 of similar scope of impact as modification 1420 to produce input F, which is then fed as input. Here again, input F failed to elicit a new error type response.

Having recognized that the previous modifications failed to elicit a new error type response, the intelligent fuzzing tool may make an even more impactful modification, as shown by the "long" modification 1430 to generate input G. Input G is feed as input to the remote service, but it too fails to produce a new error type response. Subsequently, the intelligent fuzzing tool imposes another modification 1435 to produce input H. Finally, input H, which has been modified substantially as compared to input A, results in the generation of a new error type response. In view of this new error type response, the error type response coverage is expanded. Accordingly, it will be appreciated that the disclosed embodiments are able to dynamically analyze past performance (with regard to changes on the error type response coverage) to determine how to subsequently modify new input data in order to attempt to elicit new error type responses from the service.

In some cases, after inferring or determining parent-child dependencies from the API specification (e.g., the node trees discussed earlier), the embodiments generate different sequences of requests that are designed to reach deeper service states of the service. In addition to these sequences of requests, the embodiments are also able to intelligently fuzz or modify body payload data to find even more bugs or programming deficiencies in the service's code. In some embodiments, combinations of different types of modifications (e.g., node fuzzing, tree fuzzing, and data fuzzing) may be applied in a pipeline-like manner, such as is described in the incremental process described in FIG. 14.

Accordingly, as viewed by the processes outlined in FIG. 14, the embodiments are able to intelligently and dynamically fuzz or modify data in an attempt to expand the error type response coverage (e.g., by triggering the generation of new error type responses). If a particular type of modification fails to achieve a new error type response, then the embodiments are able to identify this failure and dynamically respond by modifying their subsequent modifications. In this regard, the embodiments use automata learning in determining how to generate current input data based on the success or failure of previous input data in triggering new error type responses.

Some embodiment may allow a particular fuzzing technique to be used a threshold number of times before changing to a new fuzzing technique. For instance, in FIG. 14, the embodiments permitted a similar fuzzing or modification technique to be performed in modifications 1405, 1410, and 1415. Although only three modifications are illustrated, the number of similarly-scope modifications may be in the tens, hundreds, or perhaps thousands. In any event, the embodiments may allow a threshold number of similarly-scoped modifications to be performed prior to switching or changing fuzzing techniques, as shown by the new modification technique of modification 1420.

The fuzzing rules (e.g., fuzzing rules 800 from FIG. 8) may be defined to determine how to generate the different sets of input data or how to dynamically modify data. As described generally in FIG. 14, a first fuzzing rule may be applied to an initial set of data to generate initially fuzzed or modified data. Depending on the success or failure of this initial set of fuzzed data in triggering a new error type response, the embodiments may then selectively apply a second or subsequent fuzzing rule to the initially fuzzed data to generate additional input data.

Figure 15:
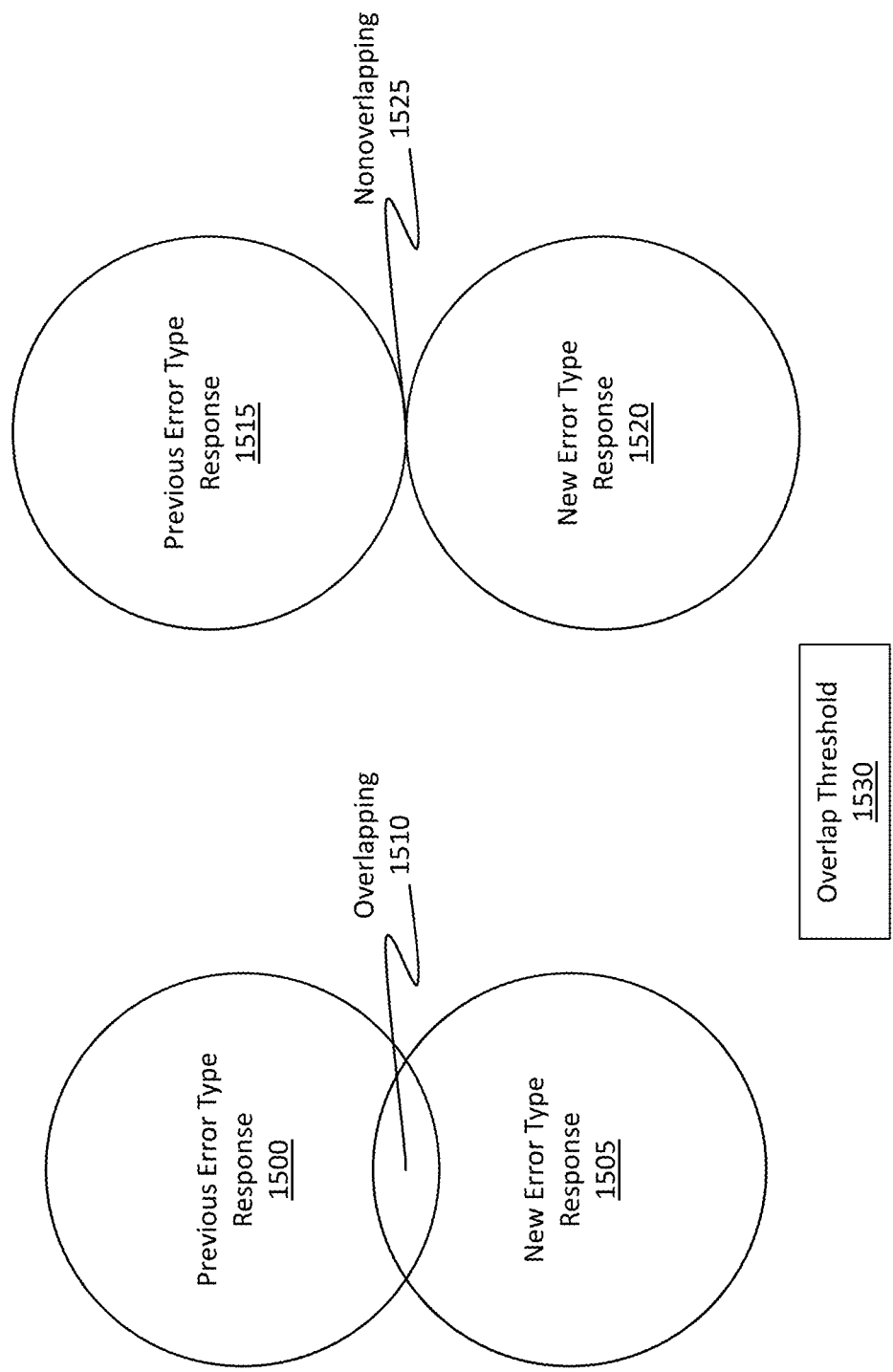
FIG. 15 illustrates how it is beneficial to reduce the amount of error type response "overlap" (i.e. different inputs produce different error type responses and thus are nonoverlapping as opposed to producing the same or overlapping error type responses) between different testing runs in order to maximize the efficiency of the testing processes and in order to reduce costs associated with performing the testing processes.

FIG. 15 provides additional detail by what is meant with the phrase "nonoverlapping," which was used in method act 145. FIG. 15 shows a previous error type response 1500, which is representative of any of the error type responses mentioned herein. In response to new input data, the remote service may issue a new error type response 1505. Previous error type response 1500 and new error type response 1505 at least partially overlap (e.g., as shown by the overlapping 1510 section). For instance, the error codes included in the two responses may be the same (while perhaps the error messages are different). Additionally, or alternatively, a portion of the error messages may be the same as between the two responses. In any event, it will be appreciated that at least some of the error data between the two responses is the same.

In contrast, FIG. 15 shows a second scenario involving a previous error type response 1515 and a new error type response 1520. Here, the two responses do not overlap, as shown by the nonoverlapping 1525 section. By nonoverlapping, it is generally meant that the error codes and perhaps even the error messages are different from one another. In order to expand the error type response coverage, it is beneficial to try to elicit as many nonoverlapping error type responses from the remote service as possible.

FIG. 15 also shows an overlap threshold 1530. It may be the case that certain input data is still considered as effective in expanding the coverage even if the resulting error type response partially overlaps an old error type response. That is, if the degree or amount of overlap does not exceed the overlap threshold 1530, then the input data may still be considered "effective" and the effective metric 1335 in FIG. 13 may reflect this effectiveness or success. By way of example, suppose certain input data resulted in an error type response having the same error code as a previous error type response, but the error type response includes a new error message. Here, the new error message is beneficial because it will help expand the error type response coverage, even though the error codes were the same.

Figure 16:
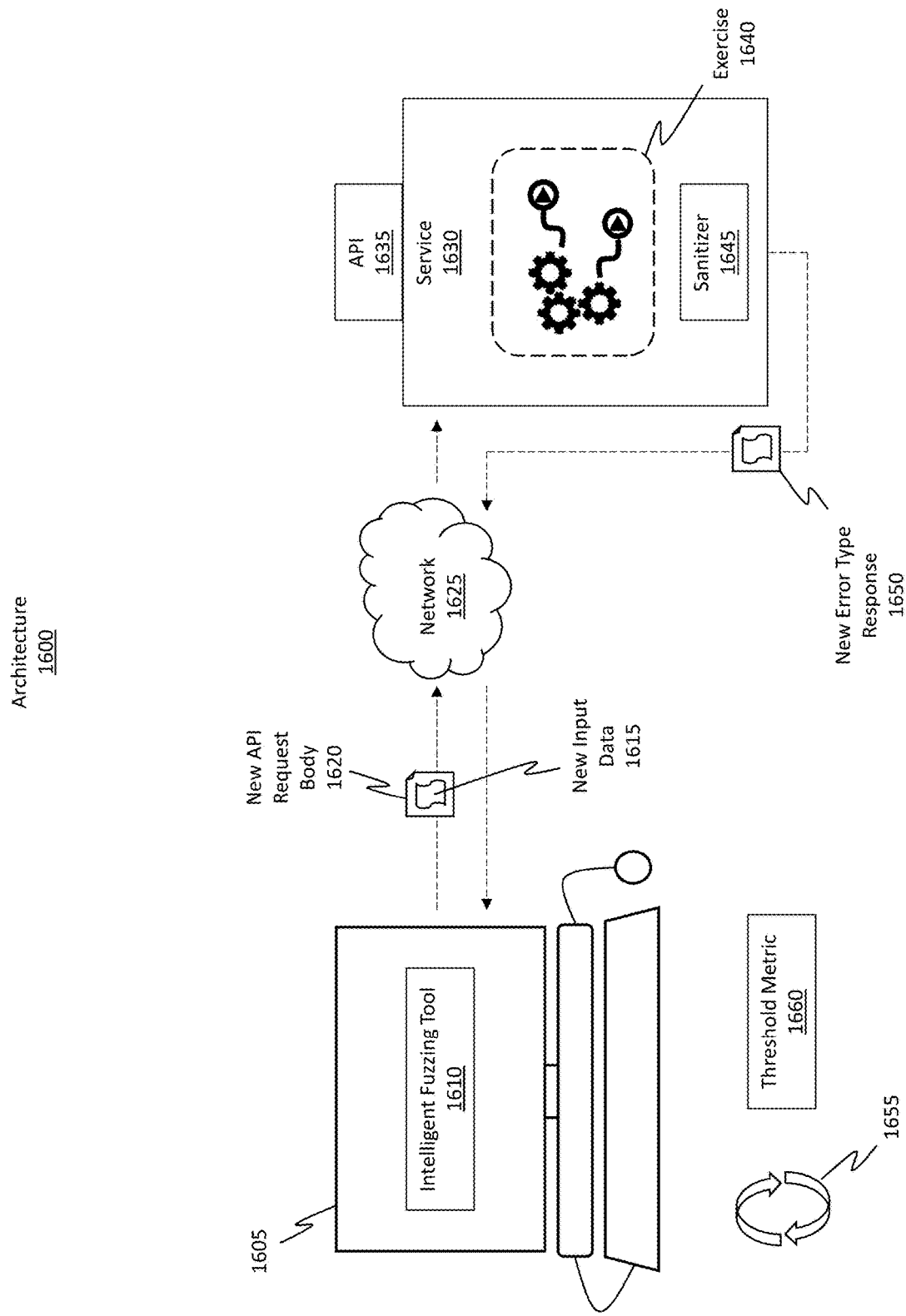
FIG. 16 illustrates another architecture in which the testing operations may be repeated any number of times until a particular threshold metric is satisfied.

FIG. 16 illustrates an example architecture 1600, which is representative of the architecture 1000 in FIG. 10 and the other architectures discussed thus far. Architecture 1600 includes a client-side computer system 1605 hosting an intelligent fuzzing tool 1610, which is representative of the other tools discussed thus far. Here, the intelligent fuzzing tool 1610 analyzed past input data and how that past input data impacted the error type response coverage.

In response to this analysis, the intelligent fuzzing tool 1610 designed a set of new input data 1615 (i.e. the new input data described in connection with act 145 from FIG. 1B) and included that new input data 1615 in a new API request body 1620. The new API request body 1620 is then transmitted over a network 1625 to the service 1630 and its corresponding API 1635, which are representative of the services and APIs discussed thus far.

The service 1630 receives the new input data 1615 and undergoes an exercise 1640 process in an attempt to handle the new input data 1615, which was purposefully designed to be invalid. Service 1630 may include a sanitizer 1645, which is configured to sanitize PII prior to sending a new error type response 1650 to the intelligent fuzzing tool 1610.

The intelligent fuzzing tool 1610 receives the new error type response 1650, analyzes the error type response (e.g., error codes, error messages, etc.) and then selectively generates new input data based on the past performance of the previous input data. Such a process may repeat 1655 until a threshold metric 1660, which is representative of the threshold metric discussed in method act 140 of FIG. 1B and the threshold metrics discussed thus far, is satisfied.

Returning to method 100, FIG. 1C shows a few optional methods acts that may also be performed. For instance, there may be an act (act 160) of identifying a particular programming deficiency (e.g., a bug) of the remote service in response to at least one received error type response.

In response to identifying the deficiency or bug, method 100 may then include an act (act 165) of triggering an alert (e.g., alert(s) 1060 from FIG. 10) identifying the particular programming deficiency. This alert may be transmitted to any number of developers or administrators managing the remote service. The alert includes information (e.g., descriptive information as well as potentially log information so as to track and identify when and how the bug was identified) so as to notify the developers of the programming deficiency.

Additionally, there is an act (act 170) of triggering one or more remedial actions (e.g., remedial action(s) 1065 from FIG. 10) to resolve the particular programming deficiency. By way of example, a trouble ticket may be issued in response to the alert, and a developer or machine may be tasked with attempting to resolve the identified programming deficiency. In this regard, the operational functionality of the remote service may be modified in response to the triggered alert so as to fix or remedy the identified deficiency. As such, the embodiments may practically apply the disclosed operations by triggering any number of remedial code-fixing actions to be performed.

Search Heuristics

The following section outlines some results of a few tests that were performed using the disclosed embodiments. One will appreciate how the following data is provided for example purposes only, and the embodiments should not be limited only to the following testing instances or testing data.

Since pipelining schema fuzzing rules results in enormous numbers of new fuzzed-schemas but fuzzing budgets are limited, it is proposed to evaluate the following three heuristics to select fuzzed-schemas generated by pipelining fuzzing rules: (1) Depth-First (DF); (2) Breadth-First (BF); and (3) Random (RD).

Depth-First (DF): Given a maximum bound M, the search heuristic DF generates fuzzed-schemas in depth-first order with respect to the pipeline stages and selects the first M fuzzed-schemas. For example, with DF, a two-stage pipeline DROP-TYPE takes an initial input schema G, generates a first fuzzed-schema $G_1 \in DROP(G)$, and then generates the set $TYPE(G_1)$ of fuzzed-schemas. It then continues generating fuzzed-schemas $TYPE(G_i)$ for other $G_i$ in $DROP(G)$ (one by one) until the bound M is reached. In other words, the search heuristic DF prioritizes more fuzzing in the later stages than in the earlier stages.

Breadth-First (BF): In contrast to DF, the search heuristic BF prioritizes fuzzing more in the earlier stages by generating fuzzed-schemas in breadth-first order. For example, with BF, a two-stage pipeline DROP-TYPE taking as input an initial schema G first generates all fuzzed-schemas $G_i$ in $DROP(G)$, then it will generate the fuzzed-schemas in $TYPE(G_j)$ for some $G_j \in DROP(G)$, and so on up to the given bound M.

Random (RD): While DF and BF prioritize fuzzing in either the later or earlier pipeline stages, respectively, the search heuristic RD uses a random search order that does not favor specific stages. For example, with RD and some random seed, a two-stage pipeline DROP-TYPE taking as input an initial schema G first generates some fuzzed-schema $G_1 \in DROP(G)$, then generates some fuzzed-schema $G_2 \in TYPE(G1)$, then generates some fuzzed-schema $G'_1 \in DROP(G)$, then generates some fuzzed-schema $G'_2 \in TYPE(G'_1)$, and so on until the given bound M is reached.

To determine the efficacy of the different fuzzing rules, testing results showed how the four schema fuzzing rules can be grouped into three groups: (1) DROP and SELECT that discover structure related errors, (2) TYPE that triggers deserialization errors due to type mismatches, and (3) DUPLICATE that discovers deserialization errors triggered by malformed request payloads (e.g., duplicated keys). The three schema fuzzing rule groups tend to have disjoint error type coverage. In an experiment, 23 schema fuzzing rule pipelines were implemented to cover different combinations of the three groups. For example, two pipelines (TYPE-DUPLICATE and DUPLICATE-TYPE) were used to combine the second and third groups.

Based on testing data, the following was observed: combining schema fuzzing rules DROP, SELECT, and TYPE as a pipeline is beneficial, in that it helps discover new error types that are not triggered by DROP, SELECT, or TYPE alone. Furthermore, based on a finer-grained analysis of the results, having DROP or SELECT at stages earlier than TYPE usually has a better error type coverage than the opposite. On the other hand, combining DUPLICATE with other schema fuzzing rules does not provide significant improvements; although the total number of covered error types is higher, the coverage is mostly the union of the individual ones.

From the testing results, it can be determined that using RD, regardless of the random seed used, provides a more stable growth rate for identifying new error types. This is desirable when only a subset of the fuzzed-schemas (e.g., the first few generated) can be tested given a limited fuzzing budget. Interestingly, similar conclusions were observed for other experimented schema fuzzing rule pipelines and for all DNS request types with non-empty body schemas. This shows that the effectiveness of the search heuristic RD depends less on the request types under test (i.e. is less sensitive to the schema structure and semantics). From these experimental results, the following conclusions may be made: combining schema fuzzing rules DROP, SELECT, and TYPE as a pipeline is helpful, especially when having DROP and SELECT before TYPE; combining the schema fuzzing rule DUPLICATE with other rules does not provide significant benefit in covering new error types; and the RD search heuristic provides a more stable growth rate in covering unique error types, and is therefore more favorable when the budget is limited.

Accordingly, the disclosed embodiments bring about substantial benefits to the technical field. In particular, the embodiments are able to selectively and intelligently generate input data that is to be fed into a service in order to exercise the service in an attempt to cause errors in the service. A report on these errors (i.e. an error type response) is then provided to an intelligent fuzzing tool. The tool analyzes the report and then generates new input data. This new input data is designed in an effort to maximize or expand an error type response coverage that is being learned about the service. In particular, the new input data is designed in an attempt to elicit new error codes and/or error messages from the service. The embodiments are able to repeatedly perform these steps until a threshold coverage level is achieved or learned about the service. Accordingly, by performing the disclosed operations, the embodiments are able to learn how the service operates in response to different inputs and are able to perform these learning processes even without access to the service's underlying source code.

Example Computer/Computer Systems

Figure 17:
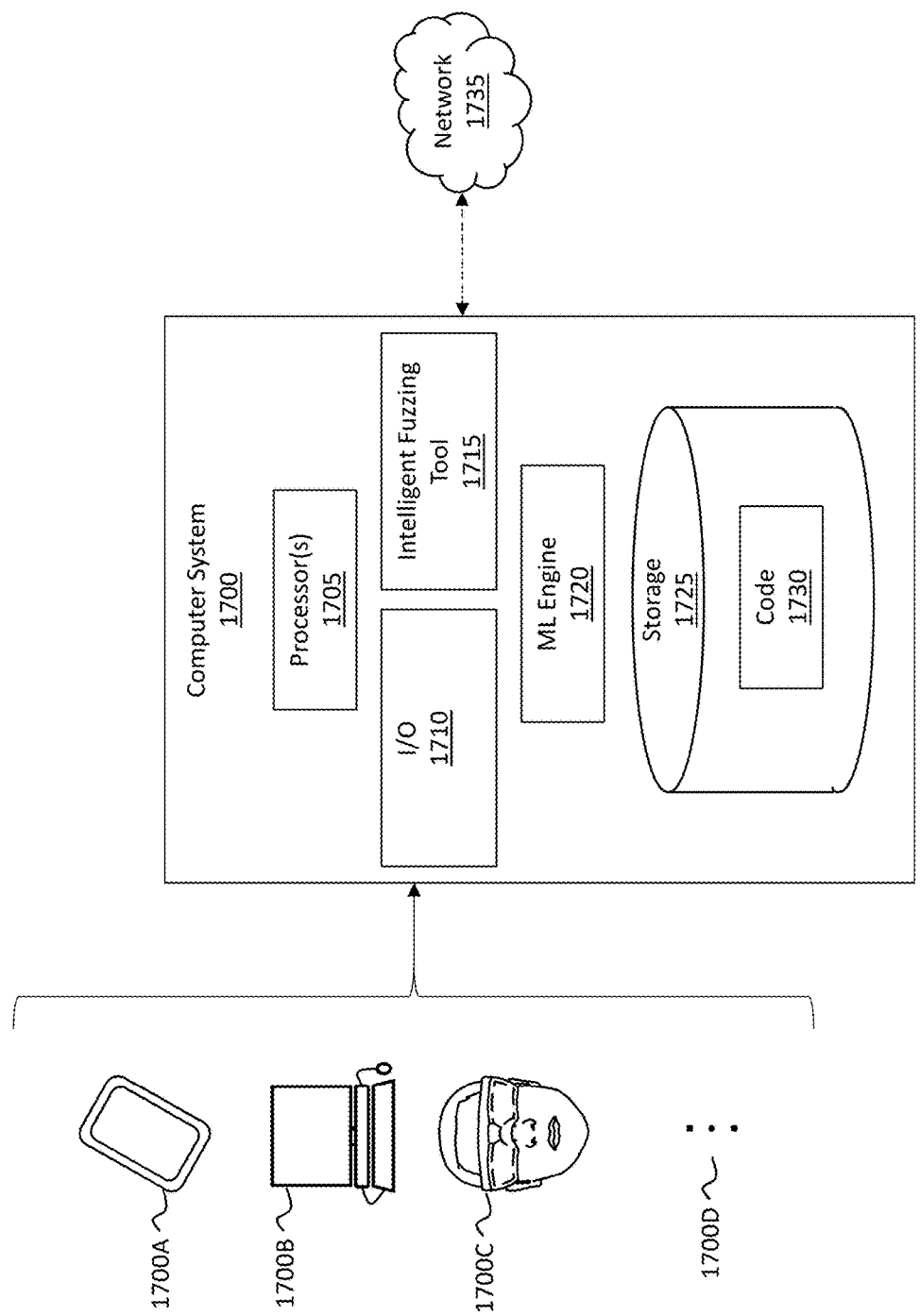
FIG. 17 illustrates an example of a computer system capable of performing any of the disclosed operations and capable of being configured in any of the disclosed manners.

Attention will now be directed to FIG. 17 which illustrates an example computer system 1700 that may include and/or be used to perform any of the operations described herein. Computer system 1700 may take various different forms. For example, computer system 1700 may be embodied as a tablet, a desktop, a laptop, a mobile device, or a standalone device, such as those described throughout this disclosure. Computer system 1700 may also be a distributed system that includes one or more connected computing components/devices that are in communication with computer system 1700. FIG. 17 shows how computer system 1700 may be embodied as a tablet 1700A, a laptop 1700B, or even a head-mounted device (HMD) 1700C. The ellipsis 1700D is provided to demonstrate how the computer system 1700 may be embodied in any computing form, without limit.

In its most basic configuration, computer system 1700 includes various different components. FIG. 17 shows that computer system 1700 includes one or more processor(s) 1705 (aka a "hardware processing unit"), input/output (I/O) 1710, an intelligent fuzzing tool 1715, a machine learning (ML) engine 1720, and storage 1725.

Regarding the processor(s) 1705, it will be appreciated that the functionality described herein can be performed, at least in part, by one or more hardware logic components (e.g., the processor(s) 1705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

I/O 1710 may include any type of input or output device communicatively coupled to the computer system 1700. Examples of input and output devices include, but are not limited to, any type of keyboard, styles, mouse, touchscreen, speaker, or even holographic input. Indeed, any device capable of providing input or receiving output from the computer system 1700 may be included in I/O 1710.

The intelligent fuzzing tool 1715 is representative of the intelligent fuzzing tool 210 described in connection with FIG. 2. That is, intelligent fuzzing tool 1715 may be configured to perform any of the disclosed operations, without limit. In some cases, the intelligent fuzzing tool 1715 is configured as a dedicated processor or processing unit while in other cases the intelligent fuzzing tool 1715 may be an executable module, which is described below.

Returning to FIG. 17, the ML engine 1720 is an example of any of the machine learning engines or automata learning described earlier. ML engine 1720 may be implemented as a specific processing unit (e.g., a dedicated processing unit as described earlier) configured to perform one or more specialized operations for the computer system 1700. As used herein, the terms "executable module," "executable component," "component," "module," or "engine" can refer to hardware processing units or to software objects, routines, or methods that may be executed on computer system 1700. The different components, modules, engines, and services described herein may be implemented as objects or processors that execute on computer system 1700 (e.g. as separate threads).

Storage 1725 may be physical system memory, which may be volatile, non-volatile, or some combination of the two. The term "memory" may also be used herein to refer to non-volatile mass storage such as physical storage media. If computer system 1700 is distributed, the processing, memory, and/or storage capability may be distributed as well.

Storage 1725 is shown as including executable instructions (i.e. code 1730). The executable instructions represent instructions that are executable by the processor(s) 1705 (or perhaps even the intelligent fuzzing tool 1715) of computer system 1700 to perform the disclosed operations, such as those described in the various methods.

The disclosed embodiments may comprise or utilize a special-purpose or general-purpose computer including computer hardware, such as, for example, one or more processors (such as processor(s) 1705) and system memory (such as storage 1725), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1700 may also be connected (via a wired or wireless connection) to external sensors (e.g., one or more remote cameras) or devices via a network 1735. For example, computer system 1700 can communicate with any number devices or cloud services to obtain or process data. In some cases, network 1735 may itself be a cloud network. Furthermore, computer system 1700 may also be connected through a wired or wireless network 1735 to remote/separate computer systems(s) that are configured to perform any of the processing described with regard to computer system 1700.

A "network," like network 1735, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1700 will include one or more communication channels that are used to communicate with the network 1735. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are executable by the one or more processors to cause the computer system to at least:
   generate an application programming interface (API) request body for an API of a remote service, the API request body comprising input data satisfying a tree-structured schema;
   transmit the API request body to the remote service to exercise the remote service in an attempt to identify a programming deficiency of the remote service using the input data;
   receive an error type response from the remote service, the error type response indicating how the remote service handled the input data;
   use the error type response to determine an error type response coverage of the remote service; and
   expand the error type response coverage by repeatedly performing at least the following until a threshold metric associated with the error type response coverage is satisfied:
   in response to learning how previously-used input data, including said input data, impacted the error type response coverage, selectively generate new input data satisfying a new tree-structured schema, the new tree-structure schema being generated by modifying the tree-structured schema based on a predetermined schema fuzzing rule, wherein:
   modifying the tree structured schema based on the predetermined schema fuzzing rule includes:
   selecting a path in the tree-structured schema;
   selecting a set of nodes on the path; and
   applying a node fuzzing rule to every node in the set of nodes to generate the new tree-structured schema;
   the new input data is selectively generated in an attempt to elicit, from the remote service, a new error type response that is nonoverlapping with previous error type responses, including said error type response, wherein the new error type response is determined to be nonoverlapping when a defined overlap threshold is satisfied by content included in the new error type response, the overlap threshold defining a permissible amount of overlap in content that is present between the content included in the new error type response and content included in the previous error type responses;

transmit a new API request body comprising the new input data to the remote service to exercise the remote service; and receive the new error type response from the remote service, the new error type response indicating how the remote service handled the new input data.

2. The computer system of claim 1, wherein the API is a representation state transfer (REST) API, and wherein the remote service is a cloud-based service.

3. The computer system of claim 1, wherein execution of the computer-executable instructions further causes the computer system to:

access an API specification of the API of the remote service, the API specification at least defining the tree-structured schema for enabling interaction with the remote service;

extract the tree-structured schema from the API specification; and generate the input data by modifying one or more data types defined by the tree-structured schema or by generating one or more data values used as input in the API request body.

4. The computer system of claim 3, wherein the tree-structured schema defines data types or data values that are supported by the API.

5. The computer system of claim 1, wherein the tree-structured schema is defined using one of: extensible markup language (XML), JavaScript objection notation (JSON), or yet another markup language (YAML).

6. The computer system of claim 1, wherein the API is one of: a simple object access protocol (SOAP) API, a remote procedure call (RPC) API, or a representational state transfer (REST) API.

7. The computer system of claim 1, wherein the error type response includes one or more of an error code, an error message, or an error type comprising an error code and error message pair.

8. The computer system of claim 7, wherein the error type response includes the error type, and wherein a number of distinct error types is used to determine an effectiveness metric for expanding the error type response coverage.

9. The computer system of claim 1, wherein access to source code of the remote service is restricted such that the computer system is prevented from being able to instrument the source code to measure code coverage.

10. The computer system of claim 1, wherein the error type response is sanitized prior to being received by the computer system such that at least the following information is prevented from being included in the error type response: timestamp data, session identification, or a globally unique identifier (GUID).

11. The computer system of claim 1, wherein a set of fuzzing rules are defined to determine how to generate the input data, and wherein a pipeline fuzzing process is performed to generate the input data, the pipeline fuzzing process comprising applying a first fuzzing rule to an initial set of data to generate initially fuzzed data and applying a second fuzzing rule to the initially fuzzed data to generate said input data, which is then included in the API request body.

12. A method for dynamically expanding an error type response coverage of a remote service, said method comprising:

generating an application programming interface (API) request body for an API of a remote service, the API request body comprising input data satisfying a tree-structured schema;

transmitting the API request body to the remote service to exercise the remote service in an attempt to identify a programming deficiency of the remote service using the input data;

receiving an error type response from the remote service, the error type response indicating how the remote service handled the input data;

using the error type response to determine an error type response coverage of the remote service; and expanding the error type response coverage by repeatedly performing at least the following until a threshold metric associated with the error type response coverage is satisfied:

in response to learning how previously-used input data, including said input data, impacted the error type response coverage, selectively generating new input data satisfying a new tree-structured schema, the new tree-structure schema being generated by modifying the tree-structured schema based on a predetermined schema fuzzing rule, wherein:

modifying the tree structured schema based on the predetermined schema fuzzing rule includes:

selecting a path in the tree-structured schema;

selecting a set of nodes on the path; and applying a node fuzzing rule to every node in the set of nodes to generate the new tree-structured schema;

the new input data is selectively generated in an attempt to elicit, from the remote service, a new error type response that is nonoverlapping with previous error type responses, including said error type response, wherein the new error type response is determined to be nonoverlapping when a defined overlap threshold is satisfied by content included in the new error type response, the overlap threshold defining a permissible amount of overlap in content that is present between the content included in the new error type response and content included in the previous error type responses;

transmitting a new API request body comprising the new input data to the remote service to exercise the remote service; and receiving the new error type response from the remote service, the new error type response indicating how the remote service handled the new input data.

13. The method of claim 12, wherein a set of fuzzing rules are defined to determine how to generate the input data.

14. The method of claim 13, wherein the set of fuzzing rules defines how to modify a node in the tree-structured schema, modifying the node in the tree-structured schema includes any one or combination of: dropping the node in the tree-structured schema, selecting the node in the tree-structured schema, duplicating the node in the tree-structured schema, or changing a type of the node in the tree-structured schema, and wherein the set of fuzzing rules further defines how to select data values to be used as input in the API request body.

15. The method of claim 12, wherein the method further includes:
- identifying a particular programming deficiency of the remote service in response to at least one received error type response;
- triggering an alert identifying the particular programming deficiency; and
- triggering one or more remedial actions to resolve the particular programming deficiency.

16. The method of claim 12, wherein the input data is based off of a set of default values that are obtained from the remote service.

17. The method of claim 12, wherein a log is maintained to track interactions with the remote service.

18. The method of claim 12, wherein selectively generating the new input data to elicit, from the remote service, the new error type response that is nonoverlapping with the previous error type responses includes identifying a specific error type response coverage area of the remote service to exercise and generating the new input data based on the specific error type response coverage area.

19. One or more hardware storage devices having stored thereon computer-executable instructions that are executable by one or more processors of a computer system to cause the computer system to at least:
- generate an application programming interface (API) request body for an API of a remote service, the API request body comprising fuzzed data satisfying a tree-structured schema;
- transmit the API request body to the remote service to exercise the remote service in an attempt to identify a programming deficiency of the remote service using the fuzzed data;
- receive an error type response from the remote service, the error type response indicating how the remote service handled the fuzzed data;
- use the error type response to determine an error type response coverage of the remote service; and
- expand the error type response coverage by repeatedly performing at least the following until a threshold metric associated with the error type response coverage is satisfied:
    - in response to learning how previously-used fuzzed data, including said fuzzed data, impacted the error type response coverage, selectively fuzz new data satisfying a new tree-structured schema, the new tree-structure schema being generated by modifying the tree-structured schema based on a predetermined schema fuzzing rule, the fuzzed new data being selectively fuzzed in an attempt to elicit, from the remote service, a new error type response that is nonoverlapping with previous error type responses, including said error type response, wherein the new error type response is determined to be nonoverlapping when a defined overlap threshold is satisfied by content included in the new error type response, the overlap threshold defining a permissible amount of overlap in content that is present between the content included in the new error type response and content included in the previous error type responses;
    - transmit a new API request body comprising the fuzzed new data to the remote service to exercise the remote service; and
    - receive the new error type response from the remote service, the new error type response indicating how the remote service handled the fuzzed new data,
- wherein a set of fuzzing rules are defined to determine how to generate input data, and
- wherein a pipeline fuzzing process is performed to generate the input data, the pipeline fuzzing process comprising applying a first fuzzing rule to an initial set of data to generate initially fuzzed data and applying a second fuzzing rule to the initially fuzzed data to generate said input data, which is then included in the API request body.

20. The one or more hardware storage devices of claim 19, wherein learning how the previously-used fuzzed data impacted the error type response is performed automata learning.

* * * * *